(12) United States Patent
  Jung

(10) Patent No.: US 10,719,338 B2
(45) Date of Patent: Jul. 21, 2020

(54) METHOD FOR RECOMMENDING CONTENT AND APPARATUS THEREFOR

(71) Applicant: Samsung Electronics Co., Ltd., Gyeonggi-do (KR)

(72) Inventor: Horyong Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 66 days.

(21) Appl. No.: 15/814,031

(22) Filed: Nov. 15, 2017

(65) Prior Publication Data

US 2018/0150305 A1    May 31, 2018

(30) Foreign Application Priority Data

Nov. 29, 2016 (KR) .................. 10-2016-0159971

(51) Int. Cl.
  *G06F 9/451*    (2018.01)
  *G06F 16/435*   (2019.01)
  (Continued)

(52) U.S. Cl.
  CPC .......... *G06F 9/451* (2018.02); *G06F 3/04847* (2013.01); *G06F 16/437* (2019.01);
  (Continued)

(58) Field of Classification Search
  CPC .... G06F 9/451; G06F 16/957; G06F 16/9535; G06F 3/04847; H04L 67/306; G06Q 30/016
  See application file for complete search history.

(56) References Cited

U.S. PATENT DOCUMENTS

| 2009/0055759 A1* | 2/2009 | Svendsen | G11B 27/00 |
| | | | 715/764 |
| 2010/0287033 A1* | 11/2010 | Mathur | G06Q 50/01 |
| | | | 705/319 |

(Continued)

FOREIGN PATENT DOCUMENTS

| KR | 10-1394247 | 5/2014 |
| KR | 10-1431418 | 8/2014 |
| KR | 10-2014-0140309 | 12/2014 |

OTHER PUBLICATIONS

European Search Report dated Jan. 19, 2018 issued in counterpart application No. 17201286.6-1217, 7 pages.

*Primary Examiner* — Tadesse Hailu
(74) *Attorney, Agent, or Firm* — The Farrell Law Firm, P.C.

(57) ABSTRACT

An electronic device includes a display configured to display a user interface; a user input unit configured to receive a user input through the user interface; a processor electrically connected to the display and the user input unit; and at least one memory electrically connected to the processor, wherein the at least one memory stores instructions to allow the at least one processor to display a plurality of user interfaces for content recommendation on the display, and if interest information of the user and identification information of another party associated with the interest information are input through the plurality of user interfaces, then the processor acquires at least one recommendation content based on the interest information, history information of the user, history information of the other party, and a recommendation weight between the user and the other party, and displays the at least one acquired recommendation content on the display.

21 Claims, 13 Drawing Sheets

(51) Int. Cl.
  *G06F 16/957*   (2019.01)
  *G06F 16/9535*  (2019.01)
  *G06Q 30/00*    (2012.01)
  *G06F 3/0484*   (2013.01)
  *H04L 29/08*    (2006.01)
  *G06F 3/0482*       (2013.01)
  *G06Q 30/06*        (2012.01)

(52) U.S. Cl.
  CPC ........ *G06F 16/957* (2019.01); *G06F 16/9535* (2019.01); *G06Q 30/016* (2013.01); *H04L 67/306* (2013.01); *G06F 3/0482* (2013.01); *G06Q 30/0631* (2013.01)

(56) References Cited

U.S. PATENT DOCUMENTS

| | | | | |
|---|---|---|---|---|
| 2010/0306249 A1* | 12/2010 | Hill | ............... | G06Q 30/02 707/769 |
| 2012/0221581 A1* | 8/2012 | Narayanan | ............ | G06F 16/903 707/748 |
| 2013/0067114 A1* | 3/2013 | Hjelm | ............... | G06Q 30/0282 709/243 |
| 2013/0219274 A1* | 8/2013 | Svendsen | ............... | G06Q 10/10 715/716 |
| 2014/0067596 A1* | 3/2014 | McGovern | ............ | G06Q 30/02 705/26.7 |
| 2014/0067696 A1* | 3/2014 | Lee | ...................... | G06Q 50/184 705/310 |
| 2014/0297672 A1 | 10/2014 | Song et al. | | |
| 2015/0261844 A1* | 9/2015 | Ramalho | ............... | H04L 67/306 707/749 |
| 2015/0269488 A1 | 9/2015 | Galai et al. | | |
| 2016/0124958 A1* | 5/2016 | Sinha | ................ | G06F 16/9535 707/733 |
| 2016/0206276 A1* | 7/2016 | Kobayashi | ............... | A61B 6/00 |
| 2016/0224640 A1 | 8/2016 | Sung et al. | | |
| 2016/0232201 A1* | 8/2016 | Goran | ..................... | G06F 16/24 |
| 2016/0283481 A1* | 9/2016 | Morley | ............. | G06Q 30/0256 |
| 2017/0255997 A1* | 9/2017 | Watson | ................. | G06Q 40/06 |
| 2017/0293873 A1* | 10/2017 | Chrapko | ........... | G06Q 10/0635 |
| 2018/0007099 A1* | 1/2018 | Ein-Gil | ................. | H04L 63/08 |

\* cited by examiner

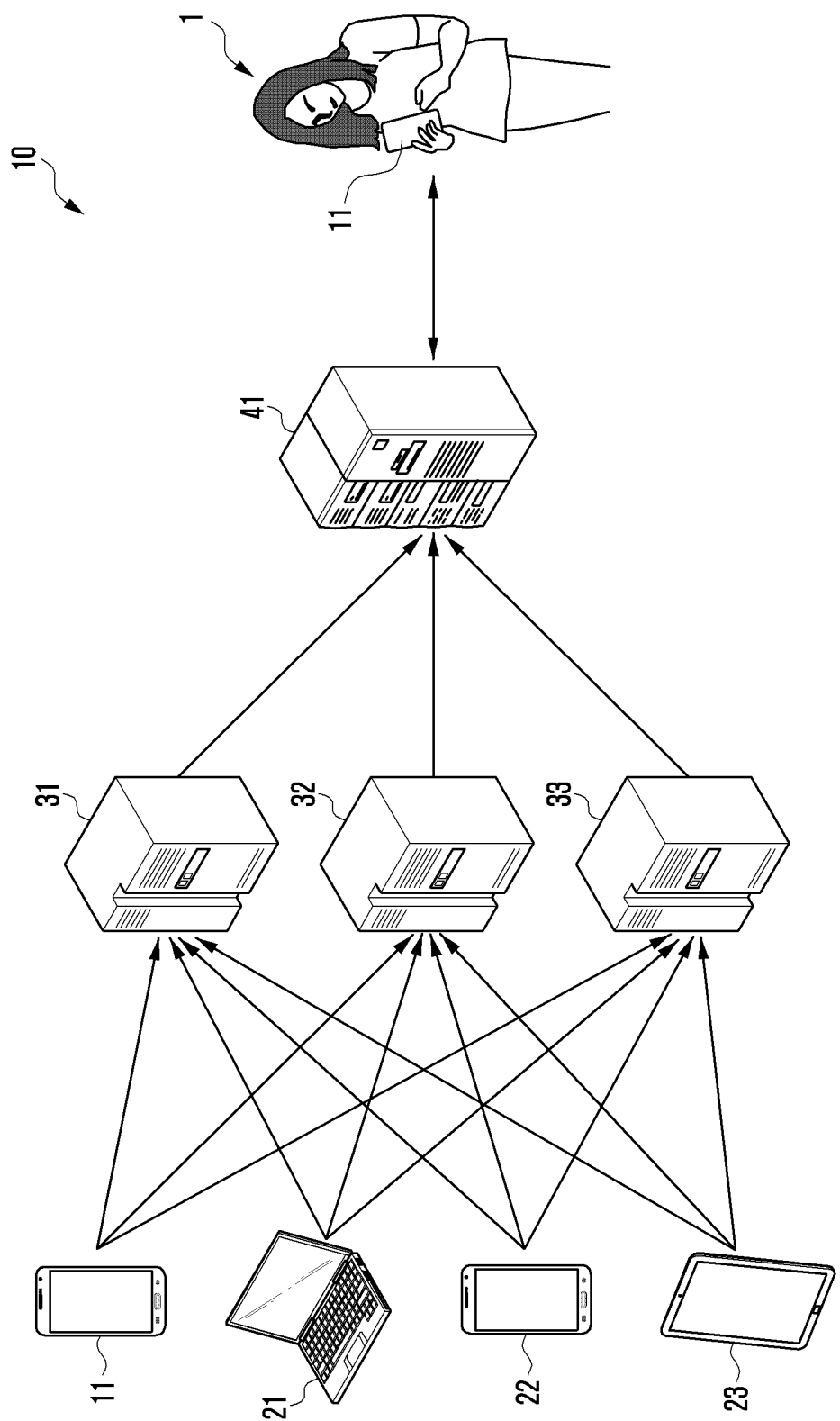

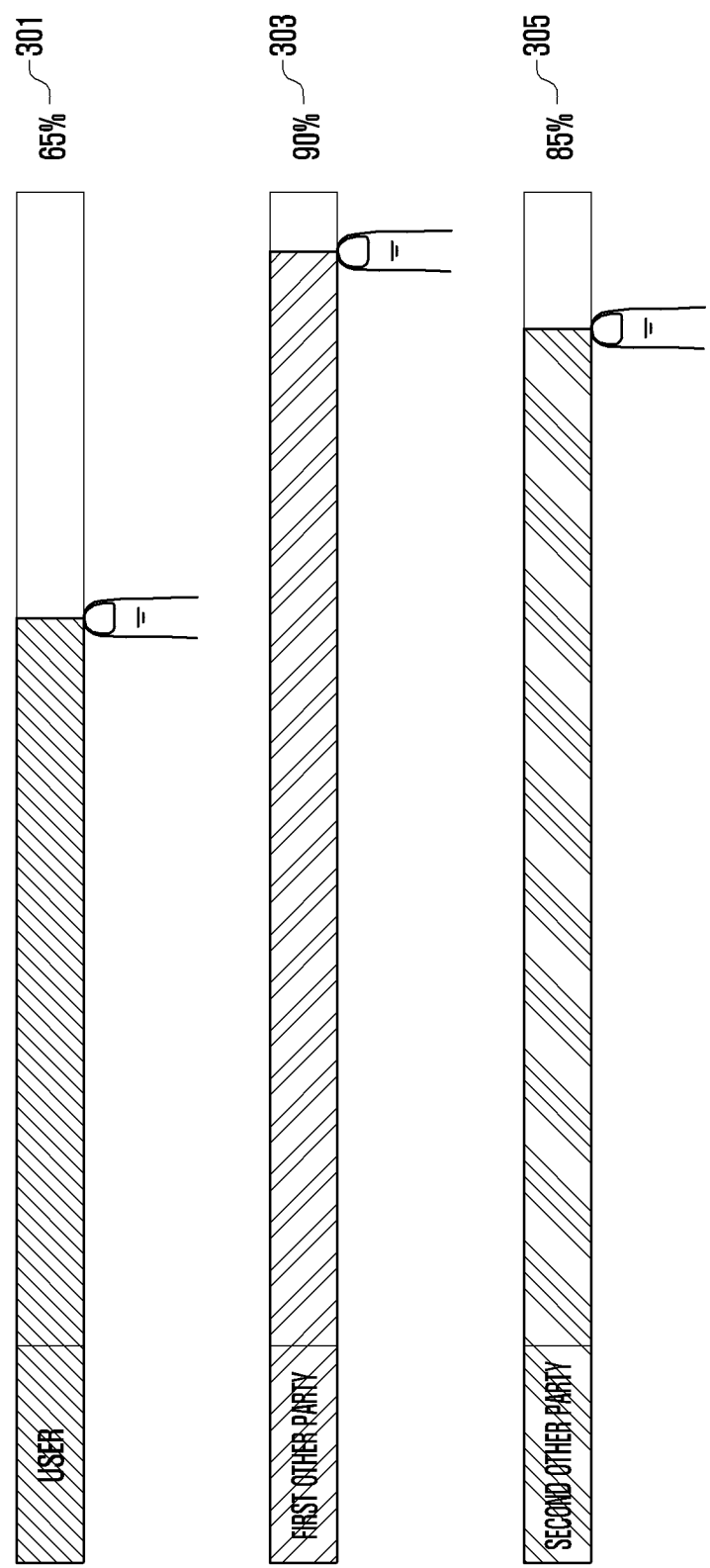

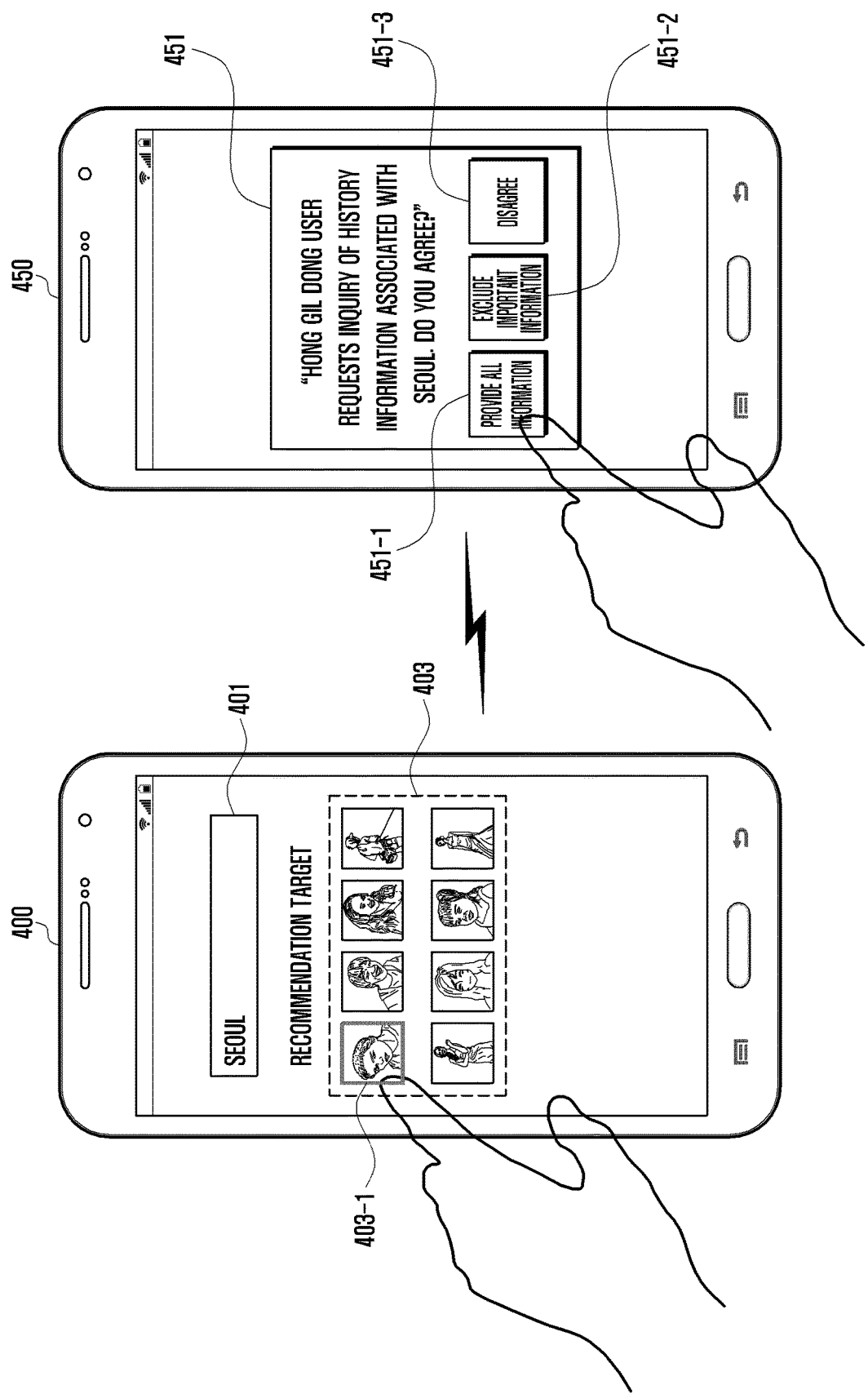

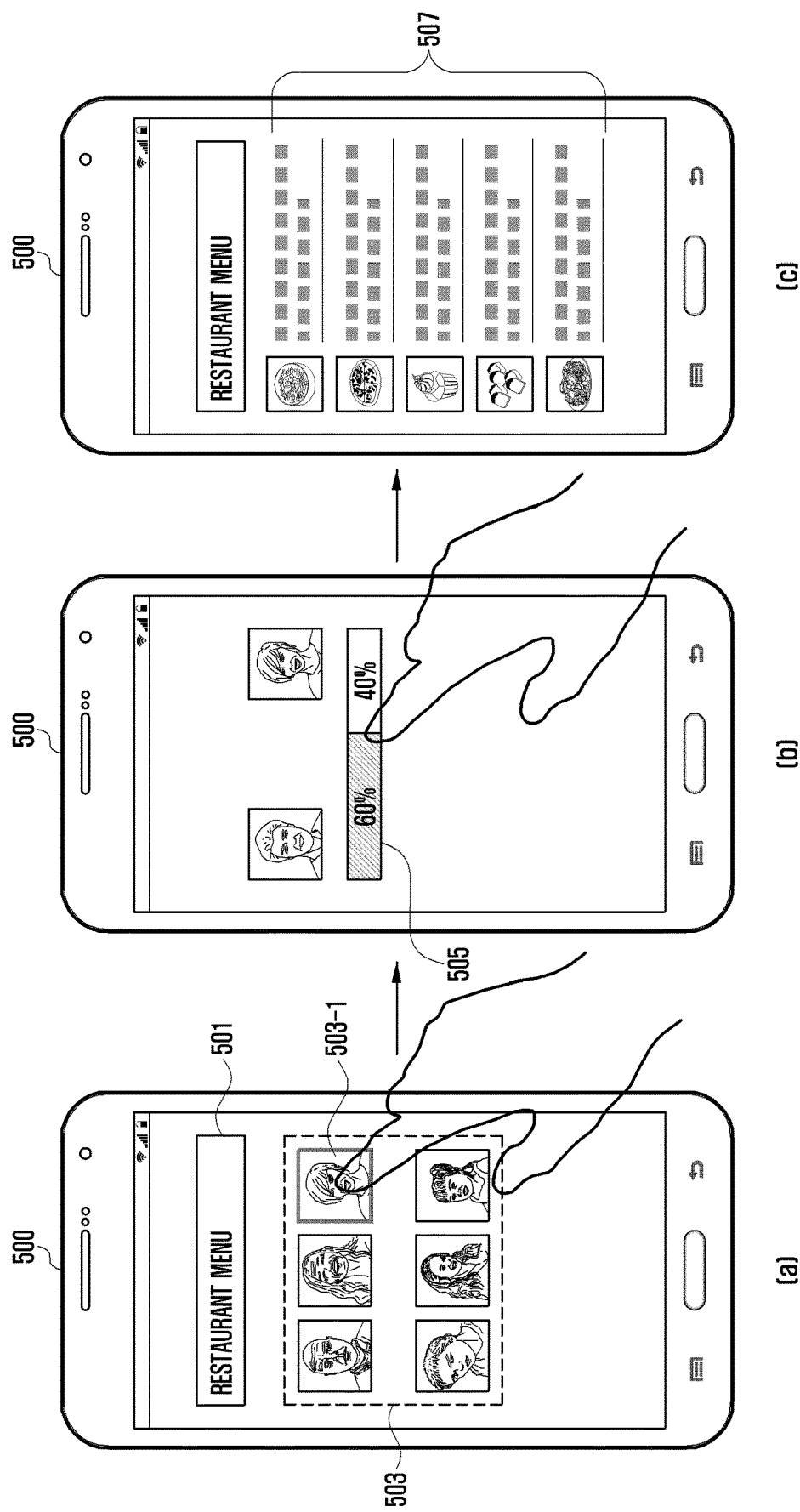

METHOD FOR RECOMMENDING CONTENT AND APPARATUS THEREFOR

PRIORITY

The present application claims priority under 35 U.S.C. § 119(a) to a Korean patent application filed on Nov. 29, 2016, filed in the Korean Intellectual Property Office and assigned Serial No. 10-2016-0159971, the entire content of which is incorporated herein by reference.

BACKGROUND

1. Field of the Disclosure

The present disclosure relates generally to a method for recommending content and apparatus therefor, and more particularly, to a method for recommending content based on history information and an apparatus therefor.

2. Description of Related Art

Traditional methods for recommending content typically recommend content that is associated with a keyword based on a keyword search in a search engine.

The search engine may further search for a user's preferred content based on history information of a user who has input the keyword.

The search engine may search for content targeting a particular field for which a user frequently uses the search engine to search for among a plurality of contents associated with the keyword. The search engine may also provide the searched content as the user's preferred content.

If the search engine is a server located outside an electronic device from which the user inputs the keyword, the search engine may transmit the searched content to the electronic device of the user.

The electronic device may display the received content on a screen and provide the displayed content to the user. The search engine may search for the content based on the user's history information. In this case, a search range may be limited in a situation where the user performs a search to search for common interests with another party, or interests of the other party.

For example, although both users and celebrities may want to search for preferred contents, existing search engines provide content that is searched based on the history information of the user, so the user has difficulty in obtaining intended search results.

SUMMARY

The present disclosure has been made to address at least the above mentioned problems and/or disadvantages and to provide a method for recommending content, taking into account preferences of a user and another party According to an aspect of the present disclosure, an electronic device for recommending recommendation content includes a display configured to display a user interface; a user input unit configured to receive a user input through the user interface; at least one processor configured to be electrically connected to the display and the user input unit; and at least one memory configured to be electrically connected to the processor, wherein the at least one memory stores instructions to allow the at least one processor to display a plurality of user interfaces for content recommendation on the display, and if interest information of the user and identification information of another party associated with the interest information are input through the plurality of user interfaces, acquire at least one recommendation based on the interest information, history information of the user, history information of the other party, and a recommendation weight between the user and the other party, and display the at least one acquired recommendation on the display.

According to an aspect of the present disclosure, are directed to a recommendation server for determining recommendation content includes a communication unit configured to communicate with a first external device and a second external device; at least one processor configured to be electrically connected to the communication unit; and at least one memory configured to be electrically connected to the at least one processor, wherein the at least one memory stores instructions to allow the processor to receive interest information of a user of a first external device, identification information of the user, and identification information of another party associated with the interest information from the first external device via the communication unit, receive history information of the user and history information of the other party from the second external device, determine at least one recommendation based on the history information of the user, the history information of the other party, and a recommendation weight between the user and the other party, and transmit the at least one determined recommendation to the first external device.

According to an aspect of the present disclosure, a method for providing recommendation content of an electronic device includes displaying a plurality of user interfaces for content recommendation; receiving interest information of the user and identification information of another party associated with the interest information through the plurality of user interfaces; acquiring at least one recommendation based on the interest information, history information of the user, history information of the other party, and a recommendation weight between the user and the other party, and displaying the acquired recommendation on a display.

According to an aspect of the present disclosure, a method for determining recommendation content of a recommendation server includes receiving interest information of a user of a first external device, identification information of the user, and identification information of another party associated with the interest information from the first external device; receiving history information of the user and history information of the other party from a second external device; determining at least one recommendation based on the history information of the user, the history information of the other party, and a recommendation weight between the user and the other party, and transmitting the at least one determined recommendation to the first external device.

According to an aspect of the present disclosure, a computer-readable non-transitory recording medium storing a program is provided, which allows an electronic device of the present disclosure to display a plurality of user interfaces for content recommendation; receive interest information of the user and identification information of another party associated with the interest information through the plurality of user interfaces; acquiring at least one recommendation based on the interest information, history information of the user, history information of the other party, and a recommendation weight between the user and the other party, and displaying the acquired recommendation on a display.

According to an aspect of the present disclosure, a computer-readable non-transitory recording medium storing a program is provided, which allows a recommendation server of the present disclosure to receive interest information of a user of a first external device, identification information of the user, and identification information of another party associated with the interest information from the first external device; receive history information of the user and history information of the other party from a second external device; determine at least one recommendation based on the history information of the user, the history information of the other party, and a recommendation weight between the user and the other party; and transmit the at least one determined recommendation to the first external device.

BRIEF DESCRIPTION OF THE DRAWINGS

The above and other aspects, features, and advantages of the present disclosure will be more apparent from the following description taken in conjunction with the accompanying drawings, in which:

FIGS. 1A and 1B illustrate a system for recommending content, according to an embodiment of the present disclosure;

FIG. 3 illustrates user interfaces for determining recommendation weights between a user and a plurality of other parties, according to an embodiment of the present disclosure;

FIG. 4 illustrates a user interface requesting approval of the other party for collecting history information, according to an embodiment of the present disclosure;

FIG. 5 illustrates a scenario for a user to provide recommendation content, according to an embodiment of the present disclosure;

Figure 1B:
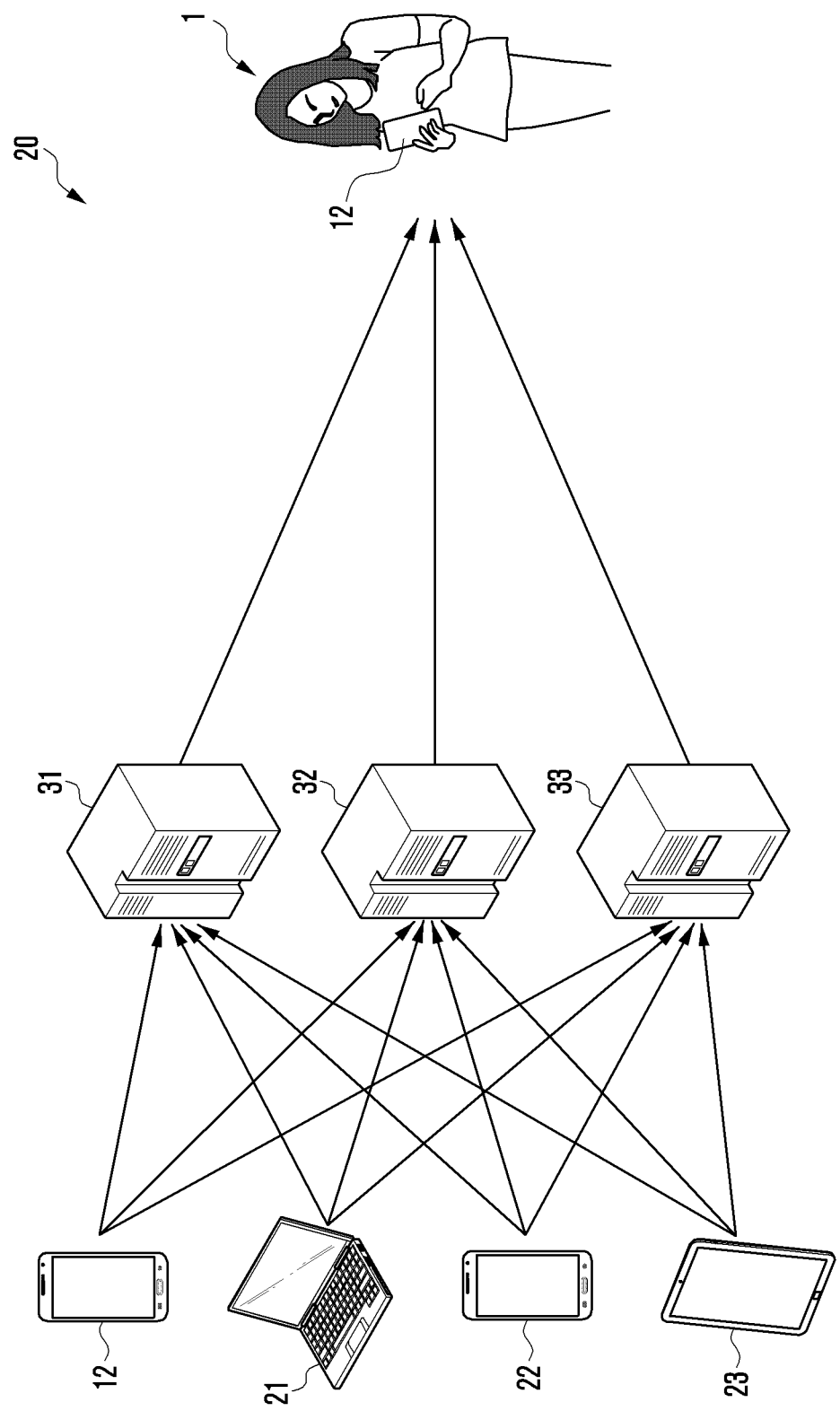

DETAILED DESCRIPTION OF EMBODIMENTS
OF THE PRESENT DISCLOSURE

The following description with reference to the accompanying drawings is provided to assist in a comprehensive understanding of embodiments of the present disclosure as defined by the claims and their equivalents. It includes specific details to assist in understanding, but those of ordinary skill in the art will recognize that various changes and modifications of the embodiments described herein may be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of embodiments of the present disclosure is provided for illustration purposes only and not for the purpose of limiting the present disclosure.

Singular forms "a", "an", and "the", include plural forms as well unless the context clearly dictates otherwise. Thus, reference to "a component surface" includes reference to one or more of such surfaces.

The expressions "include" and "may include" may refer to the presence of the disclosed functions, operations, and elements, and do not limit one or more additional functions, operations, and elements. Terms such as "include" and/or "have", may be construed to mean a certain characteristic, number, operation, constituent element, component or a combination thereof, but are not to be construed to exclude the existence or possibility of at least one additional characteristic, number, operation, constituent element, component, or combinations thereof.

In the present disclosure, the expression "and/or" includes any and all combinations of the associated listed words, and thus may include A, B, or both A and B.

Expressions including ordinal numbers, such as "first", "second", and/or the like, may modify various elements. However, such elements are not limited by the above expressions. "First" and "second" do not limit the sequence and/or importance of the elements, but are used merely for the purpose of distinguishing an element from the other elements. For example, a first user device and a second user device indicate different user devices although both are user devices. In addition, a first element may be referred to as a second element, and similarly, a second element may also be referred to as a first element without departing from the scope of the present disclosure.

Where a component is referred to as being "connected to" or "accessed by" another component, it should be understood that not only is the component connected to or accessed by the other component, but also another component may exist between the component and the other component. Where a component is referred to as being "directly connected" or "directly accessed" to a second component, it should be understood that there is no third component in between All terms including technical and/or scientific terms used herein have the same meaning as commonly understood by one of ordinary skill in the art to which the present disclosure pertains. In addition, unless otherwise defined, all terms defined in generally used dictionaries are not to be interpreted to have ideal or excessively formal meanings.

According to an embodiment of the present disclosure, an electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player (e.g., moving picture experts group phase 1 or phase 2 (MPEG-1 or MPEG-2) audio layer 3 (MP3) player), a mobile medical device, a camera, or a wearable device, such as a head-mounted-device (HMD) (e.g., electronic eyeglasses), electronic clothing, an electronic bracelet, an electronic necklace, an accessory, an electronic tattoo, and a smart watch.

An electronic device, according to an embodiment of the present disclosure, may also include smart home appliances, such as a television (TV), a digital versatile disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic album.

An electronic device, according to an embodiment of the present disclosure, may also include a medical device (e.g., magnetic resonance angiography (MRA), magnetic resonance imaging (MRI), computed tomography (CT), a scanning machine, an ultrasonic scanning device, and the like), a navigation device, a global positioning system (GPS) receiver, an event data recorder (EDR), a flight data recorder (FDR), a vehicle infotainment device, electronic equipment for a ship (e.g., navigation equipment, gyrocompass, and the like), an avionics device, a security device, a head unit for vehicles, an industrial or home robot, an automatic teller machine (ATM), and a point of sales (POS) system.

An electronic device according to an embodiment of the present disclosure may also include furniture or a part of a building/structure, an electronic board, an electronic signature receiving device, a projector, and a measuring instrument (e.g., a water meter, an electric meter, a gas meter and a wave meter). The electronic device may also include a combination of the devices listed above. In addition, the electronic device may be a flexible and/or contoured device. It should be obvious to those skilled in the art that the electronic device is not limited to the aforementioned devices.

The term "user" may refer to a person or a device (e.g., an artificial intelligence electronic device) that uses or otherwise controls the electronic device.

FIGS. 1A and 1B illustrate a system for recommending content, according to an embodiment of the present disclosure.

In FIG. 1A, a system 10 for recommending content includes an electronic device 11 of a user 1, electronic devices 21 to 23 of the other party, data servers 31 to 33, and a recommendation server 41.

In FIG. 1A, the electronic device 11 and the electronic devices 21 to 23 of the other party may be one of the types of electronic devices described above.

The data servers 31 to 33 are servers for storing, transmitting, and managing data. For example, the data servers 31 to 33 may be configured as a cloud server. Typically, the cloud server is used as a storage scheme for registering data using a software environment regardless of fixed hardware. Types of cloud services can be divided into software as a service (SaaS), platform as a service (PaaS), hardware as a service (HaaS), and infrastructure as a service (IaaS), according to service characteristics and/or a service provider.

The data servers 31 to 33 may store history information of a user. The history information of the user may include processed history information, information on a behavior pattern of the user based on the history information, or content of a candidate for recommending content.

The data servers 31 to 33 include service providing servers 31 and 32 and an agent server 33.

The service providing servers 31 and 32 are servers for providing services to a person accessing the server and may store usage histories acquired by activities of the user 1 and the other parties who access the service providing server.

The service providing server may include a search portal server, a social network service (SNS) server, a shopping server, an Internet portal server, a news server, and a media server. After the user 1 or the other party logs in, the service providing server may accumulate history information (or a behavior pattern) of the user 1 or the other party using the server in the database.

The agent server 33 may acquire and store the usage history of a user who has operated the electronic device 11 and the usage history of the other party who has operated the electronic devices 21 to 23. For example, the agent server 33 may obtain the usage history from the electronic device 11 of the user 1 or the electronic devices 21 to 23 of the other party. The usage history may include various kinds of event information generated according to the operation of the electronic device of the user 1 or the other party.

The recommendation server 41 interacts with the electronic device 11 of the user 1 to determine recommendation content and provides the determined recommendation content to the electronic device 11. The recommendation server 41 may be one of the types of electronic devices described above.

The recommendation server 41 may receive interest information of a user 1 from the electronic device 11 of the user 1. For example, if the user 1 inputs the interest information through a user interface of the electronic device 11, the electronic device 11 may transmit the inputted interest information to the recommendation server 41.

Also, the recommendation server 41 may receive identification information of the other party, which is a collection of the history information associated with the interest information, from the electronic device 11. For example, if the user 1 inputs the identification information of the other party through the user interface of the electronic device 11, the electronic device 11 may transmit the inputted interest information of the other party to the recommendation server 41. Meanwhile, the identification information of the other party may be determined in advance and stored in the recommendation server 41.

In addition, the recommendation server 41 may also receive the identification information of the user 1 of the electronic device 11 from the electronic device 11. For example, the recommendation server 41 may receive the identification information of the user 1 as the user 1 of the electronic device 11 logs in to the server. Meanwhile, the identification information of the user 1 may be determined in advance and stored in the recommendation server 41.

In addition, the recommendation server 41 may receive a recommendation weight between the user 1 and the other party from the electronic device 11. For example, if the user 1 inputs the recommendation weight between the user and the other party through the user interface of the electronic device 11, the electronic device 11 may transmit the inputted identification information of the other party to the recommendation server 41. Meanwhile, the recommendation weight between the user and the other party may be determined in advance and stored in the recommendation server 41.

The recommendation server 41 may determine at least one recommendation based on the history information of the user, the history information of the other party, and the recommendation weight between the user and the other party.

The recommendation server 41 may transmit the identification information of the user 1 and the identification information of the other party to the data servers 31 to 33. As a response to the transmission, the recommendation server 41 may receive the history information of the user 1 and the history information of the other party from the data servers 31 to 33.

Next, the recommendation server 41 may transmit the at least one determined recommendation to the electronic device 11 of the user 1.

The electronic device 11 may acquire at least one recommendation based on the interest information, the history information of the user 1, the history information of the other party, and the recommendation weight between the user and the other party.

The electronic device 11 may display at least one acquired recommendation on the display.

FIG. 1B is a diagram illustrating a system for recommending content according to an embodiment of the present disclosure.

Electronic devices 21 to 23 and data servers 31 to 33 of the other party of the system 20 for recommending content of FIG. 1B correspond to the electronic devices 21 to 23 and the data servers 31 to 33 of the other party of the system for recommending content 10 of FIG. 1A. A redundant description thereof will be omitted.

In FIG. 1B, the electronic device 12 of the user 1 may function as the recommendation server 41 of FIG. 1A.

In FIG. 1B, the electronic device 12 may display a plurality of user interfaces associated with interest information of the user 1 on the display.

If the interest information of the user 1 and the identification information of the other party associated with the interest information are input through the plurality of user interfaces, the electronic device 12 transmits the interest information of the user 1, the identification information of the user 1, and the identification information of the other party to the data servers 31 to 33.

The electronic device 12 may receive the history information of the user 1 and the history information of the other party from the data servers 31 to 33.

Next, the electronic device 12 may determine at least one recommendation based on the received history information of the user 1, the history information of the other party, and the recommendation weight between the user 1 and the other party and display the at least one determined recommendation on the display. The recommendation weight between the user 1 and the other party may be determined in advance and stored in the memory of the electronic device 12, or may be a recommendation weight received by the user 1 through the user interface.

The electronic device 12 may provide the at least one determined recommendation as audible information or as olfactory information.

The recommendation server 41 of FIG. 1A and the electronic device 12 of FIG. 1B may determine the recommendation based on a service.

Specifically, the recommendation server 41 or the electronic device 12 may transmit IDs for login as the identification information of the user 1 and the other party to the service providing servers 31 to 32, and collect the history information of the user 1 and the history information of the other party from the service providing server 31. The history information may include information which is acquired by allowing the user 1 and the other party to log in to a search portal server or a SNS service server and perform work.

The recommendation server 41 or the electronic device 12 may determine the behavior patterns of the user 1 and the other party based on the collected history information of the user 1 and the history information of the other party, and select content of a candidate associated with the interest information based on the determined behavior patterns. At least one recommendation among the content of a candidate may be determined based on the recommendation weight between the user 1 and the other party.

On the other hand, the recommendation server 41 or the electronic device 12 may collect history information of a third party other than the user 1 and the other party from the service providing servers 31 to 32 and select the content of a candidate associated with the interest information. That is, a larger number of parameters for determining a pattern of the content of a candidate may be required.

In another embodiment, there may be a method for determining, by the recommendation server 41 or the electronic device 12, a recommendation based on each electronic device.

Specifically, the recommendation server 41 or the electronic device 12 may transmit, as identification information of the user 1 and the other party, IDs of the electronic devices used by the user 1 and the other party, respectively, to the agent server 33. The recommendation server 41 or the electronic device 12 may collect, as the history information, event information generated by the operation of the electronic device of the user 1 and the electronic device of the other party from the agent server 33. In this case, the event information may include, for example, web browsing search information, SNS website usage information, keyword input information, schedule management information, and application usage information.

In an embodiment, there may be a method for combining, by a recommendation server 41 or an electronic device 12, a plurality of services to determine a recommendation.

Specifically, the recommendation server 41 or the electronic device 12 may collect history information of a plurality of users and history information of the other party from the plurality of service providing servers 31 and 32. The recommendation server 41 or the electronic device 12 may determine the behavior patterns of the user 1 and the other party based on the collected history information and select the content of a candidate associated with the interest information based on the determined behavior patterns. At least one recommendation may be determined based on the recommendation weight between the user 1 and the other party.

On the other hand, the recommendation server 41 or the electronic device 12 may collect the history information of the third party other than the user 1 and the other party from the plurality of service providing servers 31 and 32 and select the content of a candidate associated with the interest information based on the collected history information. It is possible to collectively observe and analyze behavior patterns of people using various kinds of services, and thus it is possible to select various and accurate contents for a wide range of fields.

Hereinafter an apparatus for determining a recommendation such as the recommendation server 41 of FIG. 1A or the electronic device 12 of FIG. 1B will be referred to as a recommendation device.

Next, a procedure for determining a recommendation by a recommendation device will be described.

The recommendation device may determine at least one recommendation associated with the interest information based on the history information of the user, the history information of the other party, and the recommendation weight between the user and the other party.

The recommendation device may determine a plurality of contents of candidates associated with the interest information, a user's preference and another party's preference for each of the plurality of contents of candidates.

Here, the plurality of contents of candidates, the preference of the user, and the preference of the other party for each of the plurality of contents of candidates may be determined based on the collected history information of the user and the collected history information of the other party. The plurality of contents of candidates may be content that is commonly preferred between the user and the other party, such as content that is based on a purchasing frequency, a reading frequency, or a registration frequency of the user and the other party for the history information of the user and the history information of the other party.

On the other hand, the content of a candidate or, the user's preference and the other party's preference for each content of a candidate may be directly collected as the history information.

Table 1, below, shows the user's preference and the other party's preference for each of the plurality of contents of candidates 101, 102, 103, and 104.

TABLE 1

|  | User | Other party |
|---|---|---|
| First content (101) | 0.9 | 0.2 |
| Second content (102) | 0.1 | 0.9 |
| Third content (103) | 0.8 | 0.5 |
| Fourth content (104) | 0.3 | 0.7 |

Referring to Table 1, the user's preference and the other party's preference for each content of a candidate (for example, a product) may be expressed numerically. In this case, the higher the numerical value, the higher the preference is expected.

For example, if the user's preference of the first content is 0.9 and the other party's preference is 0.2, the user's preference for the first content is expected to be higher than the other party's preference.

If the plurality of contents of candidates are determined, the recommendation device may determine at least one recommendation among the plurality of contents of candidates based on the recommendation weight between the user and the other party. The recommendation weight may be a predetermined value or a value input by the user. The user interface for determining the recommendation weight will be described below in detail with reference to FIGS. 2A and 2B.

Equation (1) is an equation for the recommendation device to determine the recommendation.

Equation (1), however, is merely an example, and various expressions for determining the recommendation using the user's preference and the other party's preference can be used.

$$\alpha \cdot prefA + (1-\alpha) prefB (0 \le \alpha \le 1) \qquad (1)$$

Referring to the above Equation (1), prefA represents a user's preference for a specific content, and prefB represents the other party's preference for a specific content. Also, a $\alpha$ value represents the recommendation weight between the user and the other party.

The recommendation device may determine the recommendation according to the recommendation weight using Equation 1. That is, as the $\alpha$ value, which is the recommendation weight, increases, the user's preferred content may be determined as the recommendation. As the recommendation weight decreases, the other party's preferred content may be determined as the recommendation. In addition, if the $\alpha$ value is about 0.5, which is an intermediate value, content which satisfies the user and the other party on average may be determined as the recommendation.

The recommendation device may determine the recommendation depending on the recommendation weight by applying, to Equation (1), the user's preference and the other party's preference for each content of a candidate in Table 1.

Specifically, in Equation (1), if the $\alpha$ value is 1, the content which is the most preferred content by the user among the contents of $\alpha$ candidate in Table 1 may be determined as the recommendation. That is, when the $\alpha$ value is 1 in Table 1, the application values of Equation (1) for the first to fourth contents may each be 0.9, 0.1, 0.8 and 0.3. In this case, the content having the highest application value may be determined as the recommendation.

In addition, if the $\alpha$ value is 0, the content which is the most preferred content by the other party among the contents of a candidate in Table 1 may be determined as the recommendation. That is, when the $\alpha$ value is 0 in Table 1, the application values of Equation (1) for the first to fourth contents may each be 0.2, 0.9, 0.5 and 0.7. In this case, the content having the highest application value may be determined as the recommendation.

In addition, if the $\alpha$ value is 0.5, the content which the user and the other party may reasonably satisfy among the contents of a candidate in Table 1 may be determined as the recommendation. That is, when the $\alpha$ value is 0 in Table 1, the application values of Equation (1) for the first to fourth contents may each be 0.55, 0.50, 0.65 and 0.50. In this case, the content having the highest application value may be determined as the recommendation.

On the other hand, a plurality of other parties may be determined as a collection target of the history information associated with interest information.

In this case, the recommendation device may collect the history information of the user associated with the interest information and the history information of the plurality of other parties.

The recommendation device may determine at least one recommendation associated with the interest information based on the history information of the user, the history information of the other party, and the predetermined recommendation weight between the user and the other party. The recommendation weight may be a predetermined value or a value determined by input from the user. The user interface for determining the recommendation weights for the plurality of other parties will be described below in detail with reference to FIG. 3.

Equation (2) is an equation for the recommendation device to determine the recommendation based on the predetermined recommendation weights between the user and the plurality of other parties.

$$m \cdot prefA + n \cdot prefB + k \cdot prefC + \ldots \quad (0 \le m \le 1, 0 \le n \le 1, 0 \le k \le 1) \qquad (2)$$

In Equation (2), prefA represents a user's preference for specific content, and prefB and prefC represent a preference for specific content for each the plurality of other parties. The value m represents a recommendation weight of the user, the value n represents a recommendation weight of a first other party, and the value k represents a recommendation weight of a second other party.

The recommendation device may determine a recommendation by considering a plurality of other parties using Equation (2) in a manner similar to that of Equation (1).

Figure 2A:
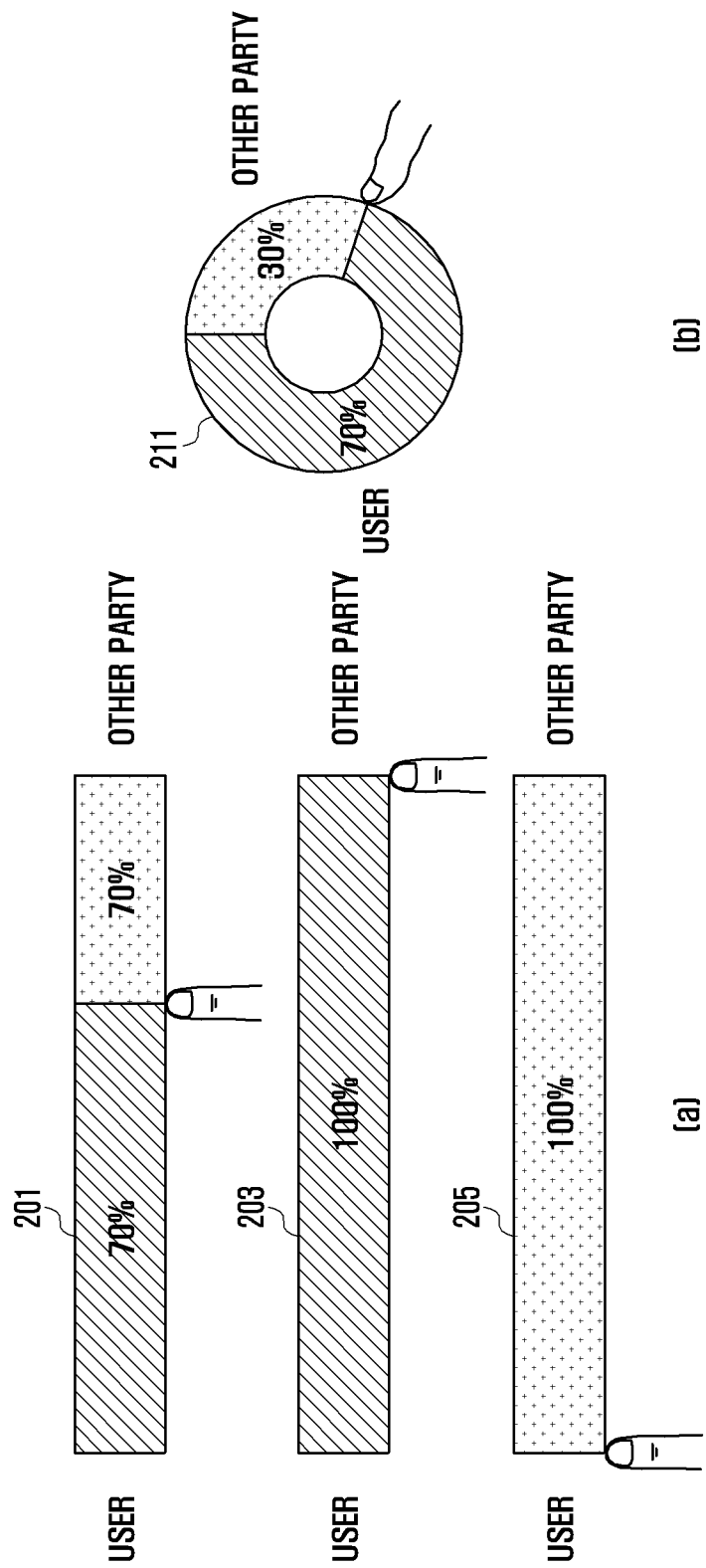
FIGS. 2A and 2B illustrate user interfaces for inputting a recommendation weight between a user and the other party, according to an embodiment of the present disclosure.
Figure 2B:
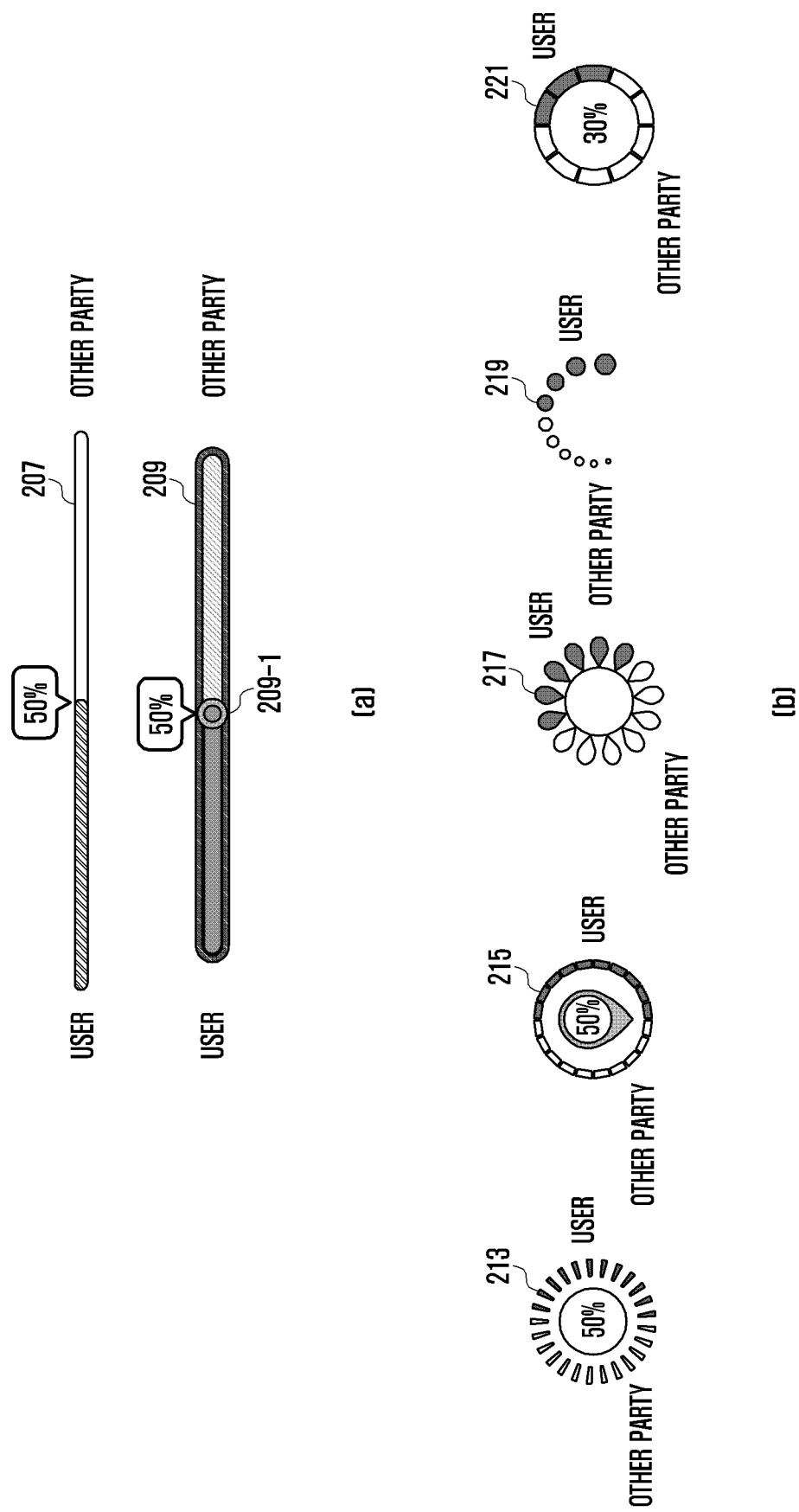

FIGS. 2A and 2B illustrate user interfaces for inputting a recommendation weight between a user and the other party, according to an embodiment of the present disclosure.

In FIGS. 2A and 2B, the user interface for receiving the recommendation weight between the user and the other party is displayed on the display of the electronic device. Here, the electronic device may be the electronic device 11 of FIG. 1A or the electronic device 12 of FIG. 1B.

As illustrated in FIGS. 2A and 2B, the user interface may be a graph for determining the recommendation weight between the user and the other party.

In this case, if a recommendation weight of either the user or the other party is input, then the other's recommendation weight may be automatically determined. Inputting the recommendation weight may include directly creating the recommendation weight by the user, selecting the recommendation weight, or determining the recommendation weight according to a drag input of the user.

For example, when assuming that a total length of a bar graph is 100% in (a) of FIG. 2A, like graph 201, if the user selects his/her recommendation weight as 70%, then the recommendation weight of the other party is automatically determined as 30%. Alternatively, like graph 203, if the user selects his/her recommendation weight as 100%, then the recommendation weight of the other party is automatically determined as 0%. Alternatively, like graph 205, if the user selects his/her recommendation weight as 0%, then the recommendation weight of the other party is automatically determined as 100%.

On the other hand, as illustrated in (b) of FIG. 2A, a circle graph 211 having a concentric circle may be used as a user interface.

In this case, when assuming that a total length of a circle graph 211 is 100% in (b) of FIG. 2A, if the user selects his/her recommendation weight as 70%, the recommendation weight of the other party is automatically determined as 30%.

FIG. 2B is illustrates another type of user interface for receiving a recommendation weight between the user and the other party.

For example, the bar graph in (a) of FIG. 2B may have a graphic for filling a bar 207, and may include an indicator 209-1 for indicating a recommendation weight along a bar 209.

In addition, in (b) of FIG. 2A, circle graphs 213, 215, 217, 219, and 221 are divided along a circle to discretely determine a recommendation weight.

In FIGS. 2A and 2B, the recommendation weight between the user and the other party determined according to the user's selection may correspond to the $\alpha$ value of Equation (1). For example, if the recommendation weight of the user is selected as 70% in FIGS. 2A and 2B, then the $\alpha$ value of Equation (1) may be determined as 0.7.

FIG. 3 illustrates user interfaces for determining recommendation weights between a user and a plurality of other parties, according to an embodiment of the present disclosure.

In FIG. 3, the user interface for receiving the recommendation weight between the user and the plurality of other parties may be displayed on the display of the electronic device. Here, the electronic device may be the electronic device 11 of FIG. 1A or the electronic device 12 of FIG. 1B.

The user interface may be a user interface for receiving recommendation weights for each of a plurality of users as illustrated in FIG. 3.

The user may select one point for each of a plurality of bar graphs 301, 303, and 305 to select recommendation weights for the user and each of the other parties.

The determined recommendation weights between the user, a first other party, and a second other party may correspond to recommendation weights m, n, and k, respectively, of Equation (2), according to the user's selection. For example, in FIG. 3, if the recommendation weight of the user is 65%, the recommendation weight of the first other party is 90%, and the recommendation weight of the second other party is 85%, the recommendation weights m, n, k of Equation (2) may each be determined as 0.65, 0.90, and 0.85.

If recommendation content using the history information of the other party is provided, a security issue associated with the privacy of the other party may occur. Therefore, it is necessary to include a procedure for receiving an inquiry of history information from the other party, prior to collecting the history information of the other party.

For example, if the user selects the other party as the collection target of the history information, then he/she may request whether the other party agrees to the collection of the history information. If the other party agrees to the collection of the history information, the electronic device may provide the recommendation based on the history information of the other party.

The other party may want to read his/her history information to unspecified individuals. In this case, the electronic device provides the recommendation based on the history information of the other party without agreeing to the collection of the history information of the other party. For example, if the user receives the interest information, the other parties who previously agreed to the reading of the history information associated with the interest information may be acquired at the same time. In this case, if the user selects at least one of the other parties, the electronic device may provide the recommendation based on the selected history information of the other party.

According to another aspect of the present disclosure, the history information of the other party may be provided while being differentiated according to the intimacy of the user and the other party. Alternatively, upon requesting whether the other party agrees to the collection of the history information, a provision level of the history information may be inquired. That is, the history information provided to the user is normalized according to the level, so different levels of history information may be collected according to the user's intimacy with the other party and the agreement level of the other party.

For example, if an inquiry level of the history information is high, then the recommendation device may collect the history information of the other party without any restriction from either the service providing server or the agent server. On the other hand, if the inquiry level of the history information is low, then the recommendation device may collect only a limited portion of the history information from the service providing server and the agent server, or when there are a plurality of service providing servers, the recommendation device may collect the history information from only some of the plurality of service providing servers.

FIG. 4 illustrates a user interface requesting approval of the other party for collecting history information, according to an embodiment of the present disclosure.

An electronic device 400 may display a first user interface 401 for receiving interest information. In addition, the electronic device 400 may display a second user interface 403 for receiving the other party which is the collection target of the history information associated with the interest information.

Next, if the interest information and the other party 403-1 are selected through the first and second user interfaces 401 and 403, the electronic device 400 may transmit a message requesting the approval of the other party to an electronic device 450 of the other party to collect the history information of the other party associated with the interest information. In this case, the transmission of the message to the electronic device 450 of the other party may occur via other nodes (e.g., base station, gateway, repeater, etc.) of the communication network. Alternatively, the message may be transmitted to the electronic device 450 of the other party via the recommendation device, as described above.

Based on the received message, the electronic device 450 of the other party may provide a user interface (e.g., a pop-up screen) 451 for inquiring whether or not to approve the collection of the history information of the other party. The inquiry information may be, for example, a text such as "00 user requests an inquiry of history information associated with 00 interest information. Do you agree?"

Further, the user interface 451 may also include sub user interfaces 451-1, 451-2, and 451-3 for receiving the inquiry level of the history information of the other party.

In this case, if the sub user interface 451-1 is selected, the electronic device 400 of the user may receive the recommendation based on all the history information of the other party associated with the interest information. Alternatively, if the sub user interface 451-2 is selected, the electronic device 400 of the user may receive the recommendation based on the history information of the other party excluding important information. In this case, the important information may be, for example, event information generated according to the use of the electronic device of the other party. Alternatively, if the sub user interface 451-3 is selected, the electronic device 400 of the user may not receive the recommendation based on the history information of the other party because the other party does not approve the history information.

If the other party agrees to the inquiry of the history information, an approval message for approving the inquiry of the usage history may be transmitted to the electronic device 400 of the user. Alternatively, the approval message may be provided to the recommendation server or the data server. Accordingly, the electronic device 400 may provide the user with the recommendation acquired based on the history information of the other party.

FIG. 5 illustrates a scenario for a user to provide a recommendation, according to an embodiment of the present disclosure.

First, in (a) of FIG. 5, the electronic device 500 may display, on a screen, a first user interface 501 for receiving interest information and a second user interface 503 for receiving the other party associated with interest information.

Next, if the user selects the interest information and the other party 503-1 through the first user interface 501 and the second user interface 503, the electronic device 500 displays the received interest information and the identification information of the other party. The interest information and the other party input by the user may include directly creating the interest information and the identification information of the other party, or the user may select specific interest information and specific identification information of the other party from the interest information and identification information of the plurality of other parties.

If the interest information and the identification information of the other party are input, as illustrated in (b) of FIG. 5, the electronic device 500 may display a third user interface 505 for receiving the recommendation weight between the user and the other party on the screen.

If the user inputs the recommendation weight through the third user interface 505, the electronic device 500 receives the input recommendation weight. In this case, the inputting of the interest information and the identification information of the other party by the user may include selecting one point of the bar graph, directly creating the recommendation weight, or selecting one of a plurality of recommendation weights as illustrated in (b) of FIG. 5.

If the interest information, the identification information of the other party, and the recommendation weight are input, the electronic device 500 transmits the received information to the recommendation device (i.e., the recommendation server 41 in FIG. 1A) together with the identification information of the user of the electronic device 500.

The recommendation device may collect the history information of the user associated with the received interest information and the history information of the other party. Recommendation content associated with the interest information may be determined based on the history information of the user, the history information of the other party, and the recommendation weight between the user and the other party.

The recommendation device may receive the recommendation content from the electronic device 500.

The electronic device 500 that has received the recommendation content may display the received recommendation content 507 on the screen, as illustrated in (c) of FIG. 5. The recommendation content displayed on the screen may reflect the preference between the user and the other party.

According to an embodiment of the present disclosure, a scenario in which a restaurant menu is recommended to a husband based on preferences of his wife may be assumed.

Specifically, if the user is the husband, the husband may input a restaurant menu as interest information through a content recommendation screen of the electronic device, and select his wife as the other party. In this case, as recommendation content, a restaurant menu reflecting the preferences of the husband and wife may be provided. At this time, different restaurant menus may be recommended according to the recommendation weight between the husband and his wife which is set by the husband.

According to an embodiment of the present disclosure, a scenario in which the user is recommended a suitable place for family summer vacation may be assumed.

Specifically, the user may input a summer vacation spot as interest information through the content recommendation screen, and select family members as the other party. The recommendation weights between the user and the family members may be set to be the same or substantially the same. Accordingly, a vacation spot may be provided that satisfies recommendation content for all family members.

According to an embodiment of the present disclosure, a scenario in which an activity satisfying all members of a group to which the user belongs may be assumed.

Specifically, the user may input an activity as the interest information through the content recommendation screen, and select members of the group as the other party. The recommendation weights between the user and the members of the group may be set to be the same or may be differentiated according to a position or intimacy. Accordingly, an activity which satisfies most group members may be provided as the recommendation content. In this case, even though the inquiry level of the history information of the members is low, meaningful recommendation content reflecting history information to some degree may be derived.

According to an embodiment of the present disclosure, a scenario in which a favorite music list is recommended by people of a club to which the user belongs may be assumed.

The user may input the music list as the interest information through the content recommendation screen, and select members of a club as the other party. Accordingly, a music list which most members of a club prefer as the recommendation content may be provided. That is, the satisfaction of the user using the content recommendation service is improved since the recommendation content using the history information of the members of the club having a similar taste to the user is acquired.

According to an embodiment of the present disclosure, a user may also be recommended content (e.g., a game) that a specific celebrity is currently playing.

The user may input the type of specific content as interest information through the content recommendation screen, and select a specific celebrity that he/she prefers. The content which the celebrity prefers is provided as the recommendation content. That is, the user can confirm the user's own interests based on the information published by a celebrity.

Figure 6:
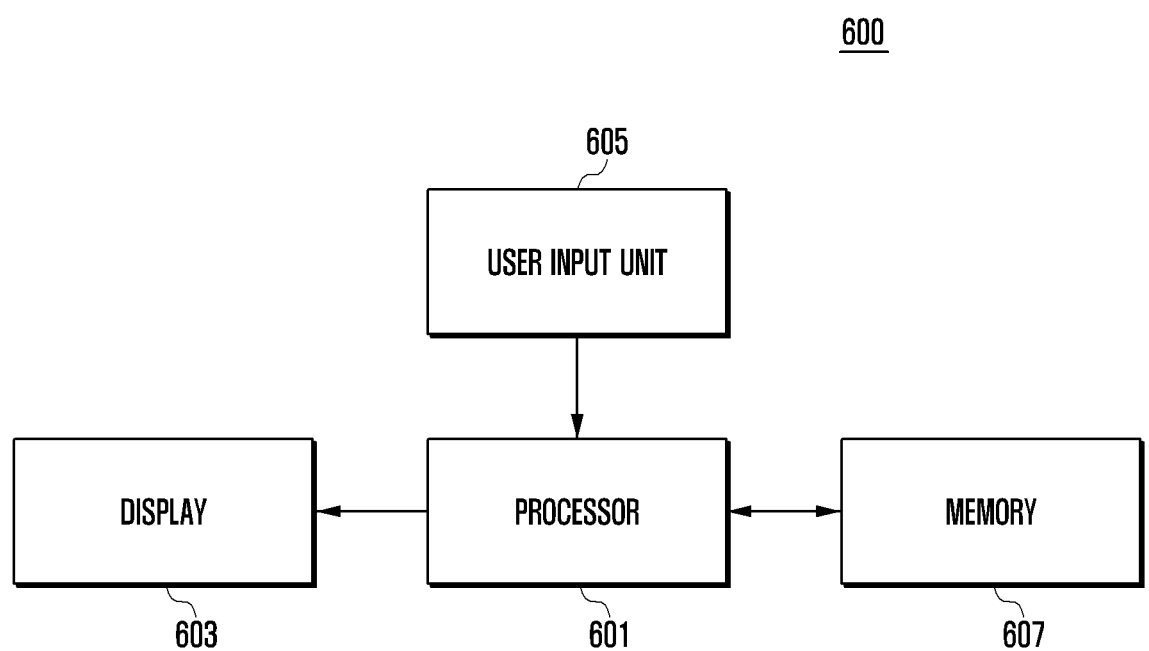
FIG. 6 is a block diagram of a configuration of an electronic device, according to an embodiment of the present disclosure.

FIG. 6 is a block diagram of a configuration of the electronic device, according to an embodiment of the present disclosure.

An electronic device 600 of FIG. 6 may include a user input unit 605, a display 603, a processor 601, and a memory 607.

The user input unit 605 receives a user input. An example of the user input unit 605 will be described below in detail with reference to an input device 1250 of FIG. 11, and therefore a redundant description thereof will be omitted. If the user input unit 605 is a touch panel stacked with the display 603, the user input may be various types of touch inputs such as a touch, a tap, a drag, and a hovering gesture.

The display 603 displays visual information. For example, the display 603 displays a user interface. An example of the display 603 will be described below in detail with reference to a display 1160 of FIG. 10 and a display 1260 of FIG. 11, and therefore a redundant description thereof will be omitted. The display 603 may display a plurality of user interfaces associated with the interest information. The plurality of user interfaces may include a user interface for receiving interest information, and a collection target of history information associated with the interest information. The plurality of user interfaces may include a user interface for identifying a user and a user interface for receiving the recommendation weight between the user and the other party. If the recommendation weight of either the other party or the user is input, the user interface may automatically determine the other recommendation weight.

The processor 601 may be electrically coupled to the display 603 and the user input 605 to control the overall operation of the electronic device 600. An example of the display 601 will be described below in detail with reference to a display 1120 of FIG. 10 and a display 1210 of FIG. 11, and therefore a redundant description thereof will be omitted.

The processor 601 may call an instruction stored in the memory 607 and display on the display 603 a plurality of user interfaces for content recommendation according to an operation based on the called instruction. If the interest information of the user and the identification information of the other party associated with the interest information are input through the plurality of user interfaces, the processor 601 may acquire at least one recommendation based on the interest information, the history information of the user, the history information of the other party, and the recommendation weights between the user and the other party, and display the acquired at least one recommendation on the display 603.

The memory 607 may be coupled to the processor 601 to store instructions for performing the operations. An example of the display 607 will be described below in detail with reference to a display 1130 of FIG. 10 and a display 1230 of FIG. 11, and therefore a redundant description thereof will be omitted.

According to an embodiment of the present disclosure, the memory 607 may store instructions to allow the processor 601 to display the plurality of user interfaces for the content recommendation on the display 603, acquire at least one recommendation based on the interest information, the history information of the user, and the history information of the other party, and the recommendation weight between the user and the other party via a plurality of user interfaces, interest information of the user through the plurality of user interfaces, and display the at least one acquired recommendation on the display 603.

According to an embodiment of the present disclosure, the plurality of user interfaces may include the user interface for receiving the recommendation weight between the user and the other party. The recommendation weight may be a recommendation weight input to the user through the user interface.

According to an embodiment of the present disclosure, the recommendation weight between the user and the other party may be determined in advance and stored in the memory 607. The recommendation weight may be determined in advance by a manufacturer of the electronic device 600, a provider of applications installed in the electronic device 600, or a provider of the operating system. Alternatively, a user may previously determine the recommendation weight in advance.

According to an embodiment of the present disclosure, the electronic device may further include a communication unit for communicating with an external device. An example of the communication unit will be described below in detail with reference to a communication interface 1170 of FIG. 10 and a communication module 1220 of FIG. 11, and therefore a redundant description thereof will be omitted. The memory 607 may further store instructions to allow the processor 601 to transmit the interest information of the user, the identification information of the user, the identification information of the other party, and the recommendation weight to the external device via the communication unit, and receive at least one recommendation from the external device via the communication unit as a response to the transmission. The external device may be the recommendation server 41 of FIG. 1A or the electronic device 12 of FIG. 1B as the recommendation device.

According to an embodiment of the present disclosure, the electronic device may further include the communication unit for communicating with the external device. The memory 607 may further store instructions to allow the processor 601 to transmit a message requesting approval of the collection of the other party's history information to the external device via the communication unit. At this time, the external device may be the electronic device or the recommendation device of the other party.

According to an embodiment of the present disclosure, the plurality of user interfaces may include the user interface for receiving the recommendation weight between the user and the other party. If the recommendation weight of either the other party or the user is input, the user interface may automatically determine the recommendation weight of the other.

According to an embodiment of the present disclosure, if the number of other parties is more than one, a plurality of user interfaces may include a user interface for receiving the recommendation weights between the user and each of the plurality of other parties.

According to an embodiment of the present disclosure, the history information may include history information on which the user and the other party have worked by accessing the service providing server. In addition, the history information may include history information according to events generated in the electronic device of the user and the electronic device of the other party.

Figure 7:
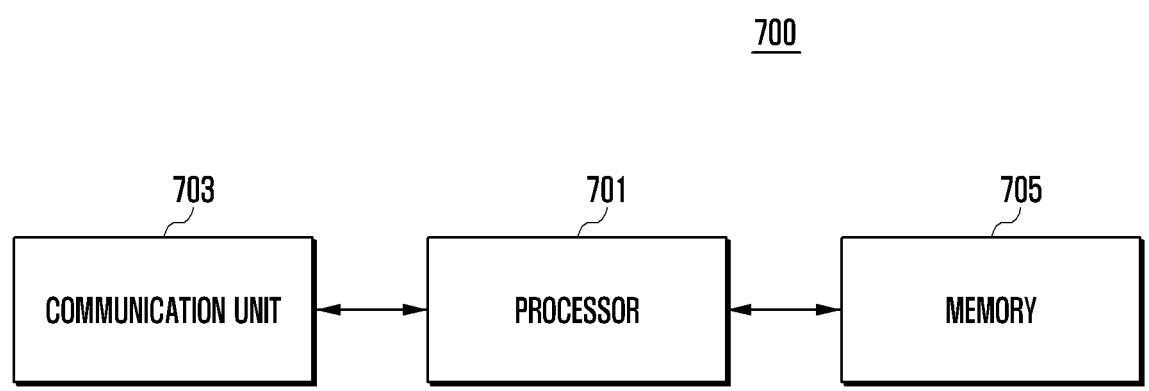
FIG. 7 is a block diagram of a configuration of a recommendation server, according to an embodiment of the present disclosure.

FIG. 7 is a block diagram of a configuration of a recommendation server, according to an embodiment of the present disclosure.

A recommendation server 700 of FIG. 7 may include a memory 705, a communication unit 703, and a processor 701.

The communication unit 703 may communicate with a first external device and a second external device. The first external device may be the electronic device 11 of FIG. 1A or the electronic device 12 of FIG. 1B as the electronic device of the user. In addition, the second external device may be the data servers 31, 32, and 33 of FIGS. 1A and 1B as a data server such as the service providing server or the agent server.

The communication unit 703 may be connected to the network through wireless or wired communication to provide a communication connection with the first external device and the second external device. The communicating connection of the communication unit 703 with the first external device and the second external device may include communication via a third device such as a repeater, a server, or a gateway.

The wireless communication may include cellular communication using at least one of, long term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communication may include at least one of wireless fidelity (WiFi), bluetooth, bluetooth low energy (BLE), zigbee, near field communication (NFC), magnetic secure transmission, radio frequency (RF), and body area network (BAN). The wired communication may include at least one of a universal serial bus (USB), a high definition multimedia interface (HDMI), a recommended standard 232 (RS-232), a power line communication, or a plain old telephone service (POTS).

The processor 701 may be electrically connected to the communication unit 703 to control the overall operation of the recommendation device 700. The processor 701 may include at least one of a central processing unit, an application processor, and a communication processor (CP). In addition, the processor 701 may be implemented as at least one of an application specific integrated circuit (ASIC), an embedded processor, a microprocessor, hardware control logic, a hardware finite state machine (FSM), and a digital signal processor (DSP).

The processor 701 may call an instruction stored in the memory 705 and receive at least one of the interest information of the user of the first external device, the identification information of the user, and the identification information of the other party associated with the interest information, from the first external device via the communication unit 703. The processor 701 may receive the history information of the user and the history information of the other party from the second external device and determine at least one recommendation based on the received history information of the user, the history information of the other party, and the recommendation weight between the user and the other party. The processor 701 may transmit the at least one determined recommendation to the first external device.

The memory 705 may be coupled to the processor 701 to store instructions for performing the operations, in accordance with the present disclosure.

The memory 705 may include at least one of an internal memory and an external memory. The internal memory 232 may include at least one of a volatile memory (for example: dynamic RAM (DRAM), static RAM (SRAM), or synchronous dynamic RAM (SDRAM)) and a non-volatile memory (for example: one time programmable ROM (OTPROM)), a programmable ROM (PROM), an erasable and programmable ROM (EPROM), an erasable and programmable ROM (EPROM), a mask ROM, a flash ROM, a flash memory, a hard drive, and a solid state drive (SSD)). The external memory 234 may include a flash drive, for example, a compact flash (CF), a secure digital (SD), a micro-SD, a mini-SD, an extreme digital (xD), a multi-media card (MMC), or a memory stick. The external memory may be functionally or physically connected to the recommendation server 700 through various interfaces.

The memory 705 may store instructions to allow the processor 701 to receive the interest information of the user of the first external device, the identification information of the user, the identification information of the other party associated with the interest information from the first external device via the communication unit 703. The instruction may allow the processor 701 to receive the history information of the user and the history information of the other party from the second external device, and determine at least one recommendation based on the recommendation between the history information of the user, the history information of the other party, and the recommendation weight between the user and the other party. The instructions may allow the processor 701 to transmit the at least one determined recommendation to the first external device. The first external device may be the electronic device 11 of FIG. 1A as the electronic device of the user. In addition, the second electronic device may be the data servers 31, 32, and 33 of FIG. 1A as the data server.

The memory 705 may store instructions to allow the processor 701 to determine a plurality of contents of candidates associated with the interest information based on the history information of the user and the history information of the other party, and to determine at least one recommendation among the plurality of contents of candidates based on the recommendation weight between the user and the other party.

The memory 705 may store instructions to allow the processor 701 to receive the recommendation weight between the user and the other party from the first external device via the communication unit 703, and determine at least one recommendation based on the received recommendation weight. The first external device may be the electronic device 11 of FIG. 1A as the electronic device of the user.

The memory 705 may further store instructions to allow the processor 701 to transmit the identification information of the user and the identification information of the other party to the second external device, and to receive the history information of the user and the history information of the other party from the second external device as the response to the transmission. The first external device may be the data servers 31, 32, and 33 of FIG. 1A as the data server.

Figure 8:
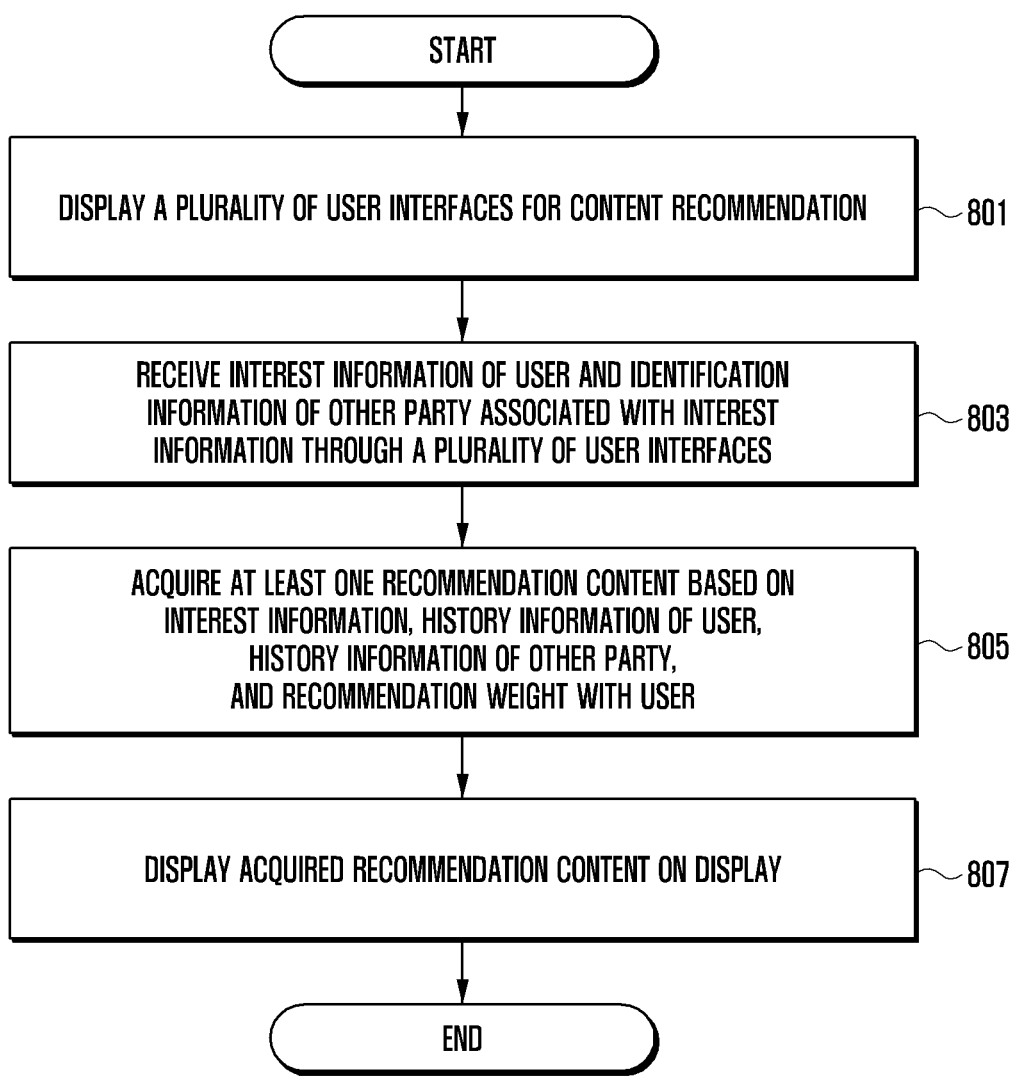
FIG. 8 is a flowchart of an electronic device providing recommendation content, according to an embodiment of the present disclosure.

FIG. 8 is a flowchart of an electronic device providing recommendation content, according to an embodiment of the present disclosure.

At step 801, the electronic device displays a plurality of user interfaces associated with the user of the electronic device.

In step 803, the electronic device receives the interest information of the user and the identification information of the other party associated with the interest information through the plurality of user interfaces.

In step 805, the electronic device 805 acquires at least one recommendation based on the interest information, the history information of the user, the history information of the other party, and the recommendation weight between the user and the other party.

In step 807, the electronic device displays the acquired recommendation on the display.

According to an embodiment of the present disclosure, the electronic device may receive the recommendation weight between the user and the other party. The electronic device may acquire at least one recommendation based on the received recommendation weight.

According to an embodiment of the present disclosure, the electronic device may transmit the interest information of the user, the identification information of the user, the identification information of the other party, and the recommendation weight to the external device in order to acquire the at least one recommendation. The electronic device may receive at least one recommendation from the external device based on the interest information, the history information of the user, the history information of the other party, and the recommendation weight that are transmitted. The external device may be the recommendation server 41 of FIG. 1A as the recommendation device According to an embodiment, the electronic device may transmit a message requesting approval of the collection of the other party's history information to the external device. The external device may be the electronic device or the electronic device of the other party.

Figure 9:
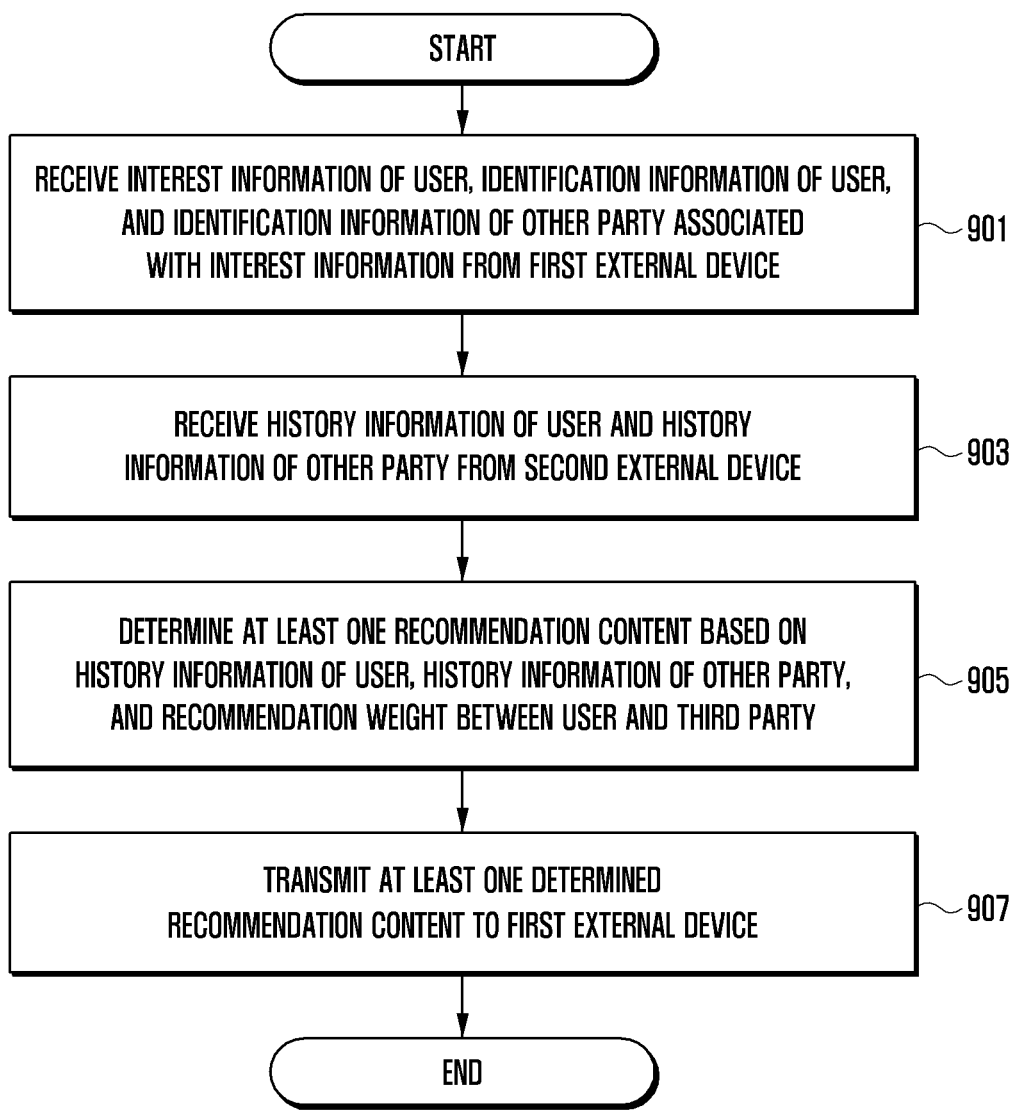
FIG. 9 is a flow chart of a recommendation server determining recommendation content, according to an embodiment of the present disclosure.

FIG. 9 is a flowchart of a recommendation server determining recommendation content according to an embodiment of the present disclosure.

In step 901, the recommendation server receives at least one of interest information of the user of the first external device, the identification information of the user, and the identification information of the other party associated with the interest information from the first external device. The first external device may be the electronic device 11 of FIG. 1A as the electronic device of the user.

In step 903, the recommendation server receives the history information of the user and the history information of the other party from the second external device. The second external device may be the data servers 31, 32, and 33 of FIG. 1A as the data server.

In step 905, the recommendation server determines at least one recommendation based on the history information of the user, the history information of the other party, and the recommendation weight between the user and the other party.

In step 907, the recommendation server transmits the at least one determined recommendation to the first external device. The first external device may be the electronic device 11 of FIG. 1A as the electronic device of the user.

According to an embodiment of the present disclosure, the recommendation server may determine the plurality of contents of candidates associated with the interest information based on the history information of the user and the history information of the other party and determine at least one recommendation among the plurality of contents of candidates based on the recommendation weight between the user and the other party, when determining the recommendation.

According to an embodiment of the present disclosure, the recommendation server may receive the recommendation weight between the user and the other party from the first external device and may determine at least one recommendation based on the received recommendation weight. The first external device may be the electronic device 11 of FIG. 1A as the electronic device of the user.

According to an embodiment of the present disclosure, an electronic device 1100 within network environment 1000 will be described with reference to FIG. 10.

Figure 10:
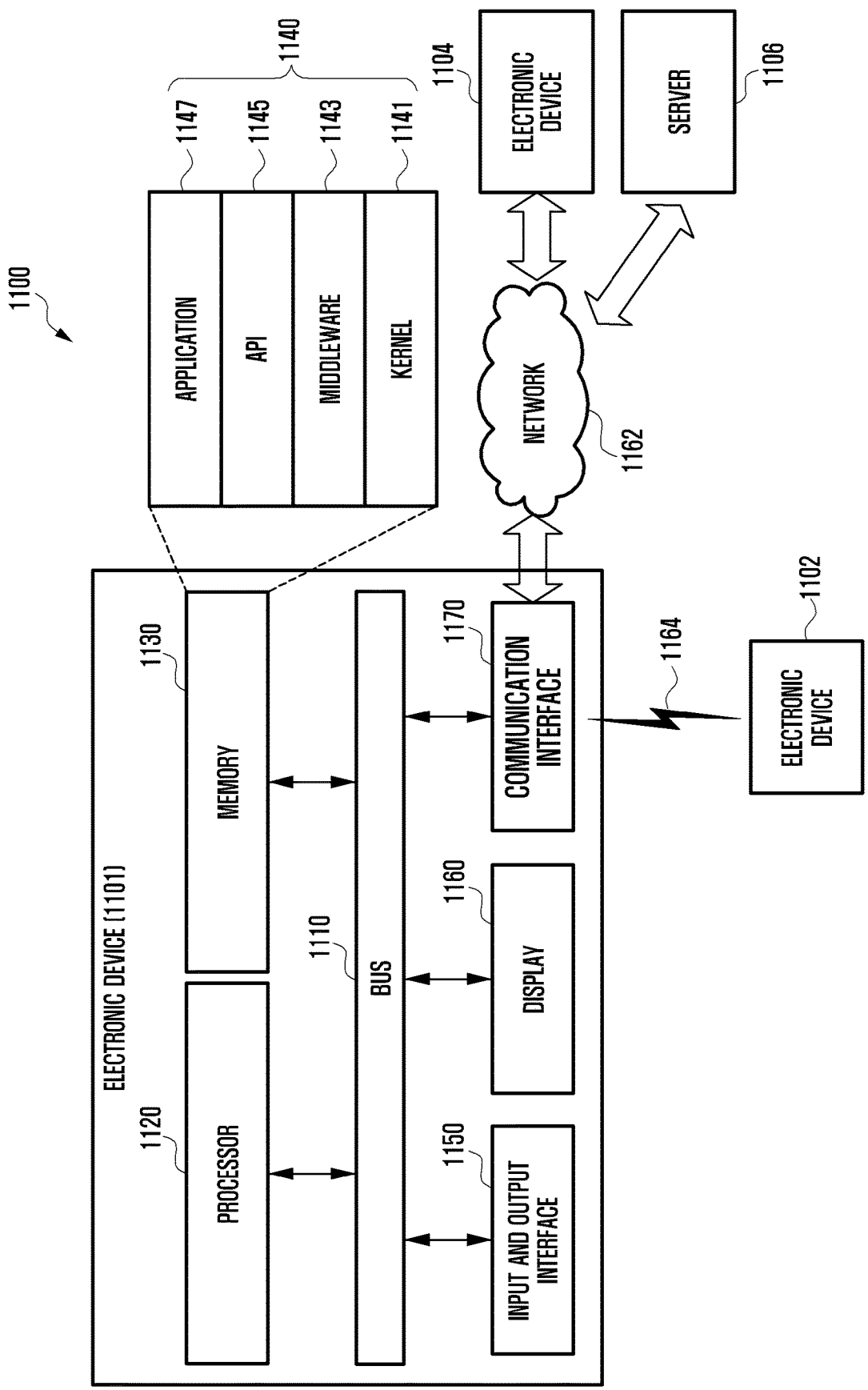
FIG. 10 is a block diagram of a configuration of an electronic device in a network environment, according to an embodiment of the present disclosure.

The electronic device 1100 of FIG. 10 may correspond to the electronic device 11 of FIG. 1A and the electronic device 12 of FIG. 1B described above. In addition, the electronic device 1100 may correspond to an electronic device that provides the user interface of FIGS. 2A to 3 described above. Additionally, the electronic device 1100 may also correspond to the electronic device 400 of FIG. 4, the electronic device 500 of FIGS. 5A to 5C, and the electronic device 600 of FIG. 6 described above.

Referring to FIG. 10, an electronic device 1101 includes a bus 1110, a processor 1120 (e.g., at least one processor), a memory 1130, an input/output (I/O) interface 1150, a display 1160 and a communication interface 170. At least one of the components may be omitted from the electronic device 1100 or the electronic device 1100 may include at least one additional component. The bus 1110 connects between the components 1120 to 1170 and may include a circuit providing communication (for example, control message or data) between the components. The processor 1120 includes at least one of a central processing unit, an application processor (AP), and a communication processor (CP). The processor 1120 performs an operation or data processing with respect to a control and/or communication with the other components of the electronic device 1100.

The memory 1130 includes a volatile and/or non-volatile memory. The memory 1130 stores instructions or data associated with the other components of the electronic device 1100. The memory 1130 stores software and/or a program 1140.

The program 1140 includes a kernel 1141, middleware 1143, an application programming interface (API) 1145, and/or an application program 1147. At least a part of the kernel 1141, the middleware 1143, and the API 1145 may be called an operating system (OS). The kernel 1141 may control or manage system resources (for example, the bus 1110, the processor 1120, or the memory 1130) used to execute operations or functions implemented in other programs (for example: the middleware 1143, the API 1145, or the application program 1147). Further, the kernel 1141 may access individual components of the electronic device 10 in the middleware 1143, the API 1145, or the application program 1147 to provide an interface that may control or manage system resources.

The middleware 1143 may serve as a relay to transmit and receive data by providing communication between the API 1145 or the application program 1147 and the kernel 1141. The middleware 1143 may process work requests received from the application program 1147 according to a priority. For example, the middleware 1143 may allocate priority which may use a system resource (for example, bus 1110, processor 1120, or memory 1130) of the electronic device 1100 to at least one of the application programs 1147, and process at least one work request.

The API 1145 is an interface for allocating the application 1147 to control functions provided by the kernel 1141, or the middleware 1143, and may include at least one interface or function (for example, an instruction) for file control, window control, image processing, or character control. The input/output interface 1150 may transfer instructions or data input from a user or other external devices to other components of the electronic device 1100, or output instructions or data received from other components of the electronic device 1100 to a user or other external devices.

The display 1160 may include a liquid crystal display (LCD), a light emitting diode (LED) display, an organic light emitting diode (OLED) display, a microelectromechanical-systems (MEMS) display, or an electronic paper display. The display 1160 may display various contents (for example, text, image, video, icon, and/or symbol) to a user. The display 1160 may include a touch screen and may receive touch, gesture, proximity, or hovering input using an electronic pen or a user's body part.

The communication interface 1170 may set communication between the electronic device 1100 and a first external device 1102, a second external device 1104, or a server 1106. The communication interface 1170 may communicate with the second external electronic device 1104 or server 1106 through wireless communication or wired communication over the network 1162.

The wireless communication may include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include at least one of, wireless fidelity (WiFi), bluetooth, bluetooth low energy (BLE), zigbee, near field communication (NFC), magnetic secure transmission, radio frequency (RF), body area network (BAN), global navigation satellite system (GNSS), global positioning system (GPS), global navigation satellite system (Glonass), Beidou navigation satellite system (Beidou), or Galileo, the European global satellite-based navigation system. Hereinafter, in the present document, the term "GPS" may be used interchangeably with the term "GNSS".

The wired communication may include universal serial bus (USB), high definition multimedia interface (HDMI), recommended standard 232 (RS-232), and plain old telephone service (POTS). The network 1162 may include a telecommunication network, a computer network, the Internet, an Internet of things (IoT) network, and a telephone network.

The first and second external electronic devices 1102 and 1104 may each be the same or different types of devices as or from the electronic device 1100. All or a part of the operations executed in the electronic device 1100 may be executed by the electronic devices 1102 and 1104 and/or the server 1106. When the electronic device 1100 automatically performs any function or service, or performs any function or service depending on a request, the electronic device 1100 itself does not execute functions or services but may request at least a part of the functions associated therewith to the electronic devices 102 and/or 1104 or the server 1106. The other electronic devices may execute the requested function or additional functions and may transfer the result to the electronic device 1100. The electronic device 1100 may process the received result as it is or additionally provide the requested function or service using cloud computing, distributed computing, or client-server computing technology.

Figure 11:
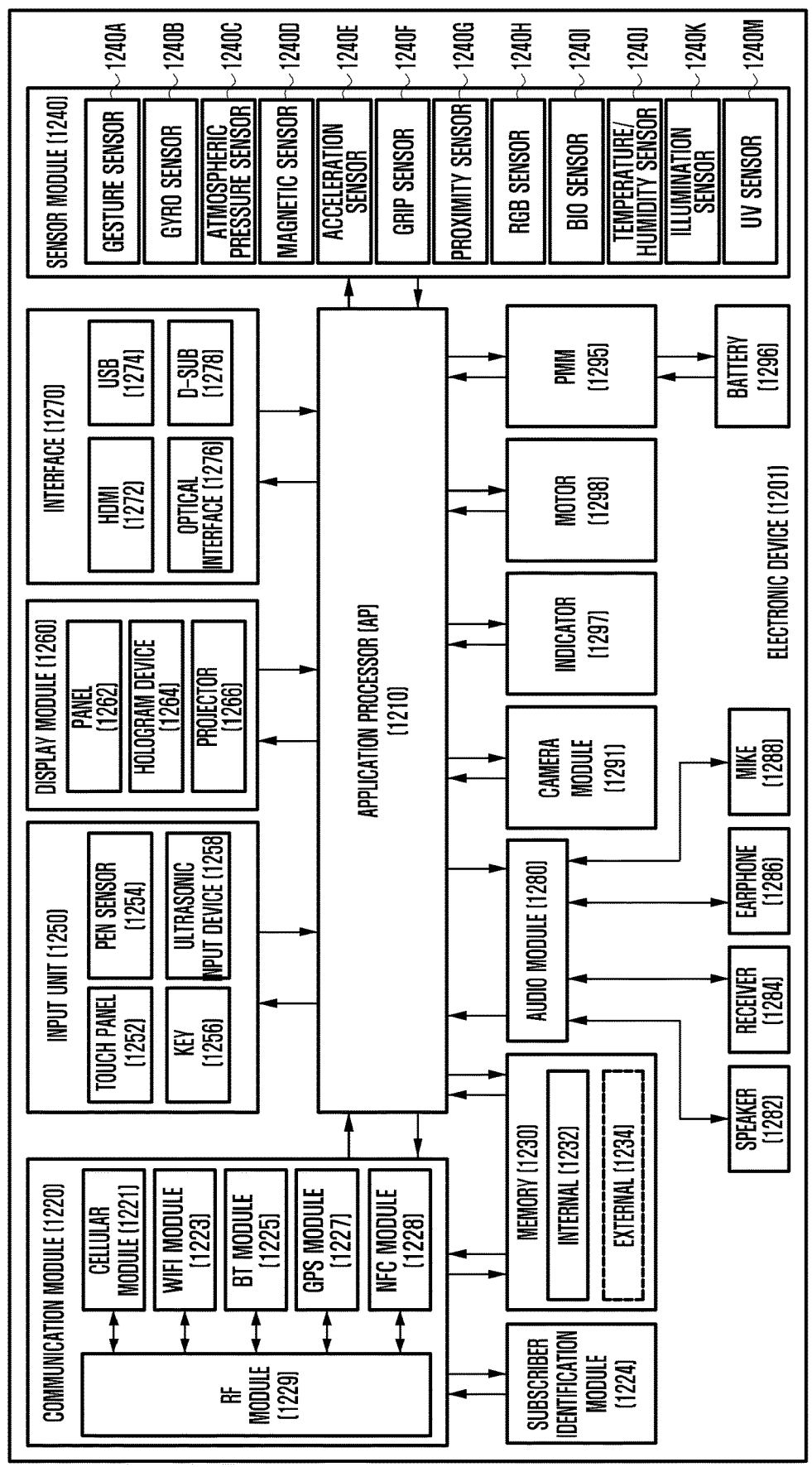
FIG. 11 is a block diagram of a configuration of the electronic device, according to an embodiment of the present disclosure.

FIG. 11 is a block diagram of a configuration of an electronic device 1201, according to an embodiment of the present disclosure. The electronic device 1201 may include all or part of the electronic device 1100 illustrated in FIG. 10. An electronic device 1201 includes an application processor AP 1210, a communication module 1220, a subscriber identification module (SIM) card 1224, a memory 1230, a sensor module 1240, an input device 1250, a display module 1260, an interface 1270, an audio module 1280, a camera module 1291, a power management module 1295, a battery 1296, an indicator 1297, and a motor 1298.

The AP 1210 may include processing circuitry and control a plurality of hardware or software components connected thereto by executing the OS or applications, process data including multimedia data, and perform corresponding operations. The AP 1210 may be implemented with a system on chip (SoC) and may further include a graphics processing unit (GPU).

The processor 1210 may also include at least part (for example, cellular module 1221) of the components illustrated in FIG. 11. The processor 1210 may load instructions or data received from another component (for example, non-volatile memory) into a volatile memory and process it and store the resulting data in the non-volatile memory.

The communication module 1220 may include various communication circuitry, such as the cellular module 1221, a Wi-Fi module 1223, a BT module 1225, a GPS module 1227, an NFC module 1228 and a radio frequency (RF) module 1229.

The cellular module 1221 may provide voice call, video call, short message service (SMS), or Internet service, via a communication network (e.g., LTE, LTE-A, CDMA, WCDMA, UMTS, Wi-Bro, or GSM). At least some of the cellular module 1221, the WiFi module 1223, the Bluetooth module 1225, the GNSS module 1227, and the NFC module 1228 may be included in one integrated chip (IC) or an IC package. The RF module 1229 may transmit and receive a communication signal (such as an RF signal).

The memory 1230 includes built-in or internal memory 1232 and/or external memory 1234. The internal memory 1232 may include at least one of a volatile memory, (e.g., dynamic random access memory (DRAM), static RAM (SRAM), and synchronous dynamic RAM (SDRAM)), a non-volatile memory, (e.g., one time programmable read only memory (OTPROM) and programmable ROM (PROM)), erasable and programmable ROM (EPROM), electrically erasable and programmable ROM (EEPROM), mask ROM, flash ROM, NAND flash memory, and NOR flash memory.

The internal memory 1232 may be a solid state drive (SSD). The external memory 1234 may include a flash drive such as a compact flash (CF), secure digital (SD), micro-SD, mini-SD, extreme digital (XD), and a memory stick. The external memory 1234 may be functionally connected to the electronic device 1201 via various types of interfaces.

The sensor module 1240 may measure a physical quantity or sense operation states of the electronic device 1201, and convert the measured or sensed data into electrical signals. The sensor module 1240 includes at least one of a gesture sensor 1240A, a gyro sensor 1240B, an atmospheric pressure (barometer) sensor 1240C, a magnetic sensor 1240D, an acceleration sensor 1240E, a grip sensor 1240F, a proximity sensor 1240G, a red, green, blue (RGB) sensor, a biometric sensor 1240I, a temperature/humidity sensor 1240J, an illuminance sensor 1240K, and an ultra-violet (UV) sensor 1240M.

The input device 1250 includes various input circuitry, such as a touch panel 1252, a pen sensor 1254 (i.e., a digital pen sensor or digital stylus), a key 1256 and an ultrasonic input device 1258. The touch panel 1252 may sense a touch using a capacitive sensing mode, a pressure sensing mode, an infrared sensing mode, and an ultrasonic sensing mode. The touch panel 1252 may further include a control circuit. When the touch panel 1252 is designed to operate in a capacitive sensing mode, the panel may also sense mechanical/physical touches or a proximity of an object. The touch panel 1252 may further include a tactile layer to provide tactile feedback to the user.

The display 1260 may include a panel 1262, a hologram device 1264, a projector 1266, and/or a control circuit for controlling them. The panel 1262 may be implemented to be, flexible, transparent, or wearable. The panel 1262 may be configured as the touch panel 1252 and at least one other module.

The interface 1270 may include an HDMI 1272, a USB 1274, an optical interface 1276, and a D-subminiature (D-sub) 1278. The interface 1270 may also be included in the communication interface 1170 shown in FIG. 10, and include a mobile high-definition link (MHL) interface, a SD card, a multi-media card (MMC) interface, and an Infrared Data Association (IrDA) standard interface.

The audio module 1280 may provide conversions between audio and electrical signals. At least part of the components in the audio module 1280 may be included in the I/O interface 1150 shown in FIG. 10. The audio module 1280 may process audio outputted through a speaker 1282, a receiver 1284, earphones 1286, and a microphone 1288.

The camera module 1291 may take still images or moving images. In an embodiment of the present disclosure, the camera module 1291 may include one or more image sensors on the front side and/or the back side, a lens, an image signal processor (ISP), and a flash (e.g., an LED or a xenon lamp).

The indicator 1297 shows states of the electronic device 1201 or of the parts thereof (e.g., the AP 1210), such as a booting state, a message state, and a recharging state. The motor 1298 converts an electrical signal into a mechanical vibration.

Each of the elements, units, and/or components, of the electronic device may be implemented with one or more elements, units, and/or components, and may be called different names according to types of electronic devices. The electronic device may include at least one element described above and may be modified in such a way as to remove some of the elements or include new elements. In addition, the electronic device may also be modified to integrate parts of the elements into one entity that performs their original functions.

In the present disclosure, the term "module" may refer to a "unit" including hardware, software, firmware, or a combination thereof. The term "module" may be interchangeably used with the terms "unit," "logic," "logical block," "component," and "circuit". A "module" may be the least identifiable unit or part of an integrated component and may be the smallest unit or part that may perform one or more functions of the module. A "module" may be implemented through mechanical or electronic modes. For example, "modules" may be implemented with at least one of a dedicated processor, a CPU, an application specific integrated circuit (ASIC) chip, a field programmable gate array (FPGAs) and a programmable logic device that may perform known functions or functions to be developed.

At least some of the devices (for example, modules or functions thereof) or the methods (for example, operations) may be implemented as commands stored in a computer readable storage medium in a form or a program module. If the instructions are executed by the processor, the processor may perform functions corresponding to the instructions. The computer-readable recording media may include a hard disk, a floppy disk, a magnetic medium (such as magnetic tape), optical recording media (for example, a compact disc-ROM (CD-ROM), DVD, and a magnetic-optical medium (for example: floptical disk)), and an internal memory. The instructions may include codes made by a compiler or codes that may be executed by an interpreter.

The module or the program module may include at least one of the above-mentioned components, and may or may not include some thereof, or may further include other components. The operations executed by the module, the program module, or other components may be performed sequentially, in parallel, repeatedly, or heuristically. At least some operations may be executed in another order or omitted, or other operations may be added.

While the present disclosure has been shown and described with reference to certain embodiments thereof, it will be apparent to those skilled in the art that the present disclosure is not limited to these embodiments, and various changes in form and details may be made therein without departing from the spirit and scope of the present disclosure as defined by the appended claims and their equivalents.

What is claimed is:

1. An electronic device for providing recommendation content, comprising:
    a display configured to display a user interface;
    a user input unit configured to receive a user input through the user interface;
    at least one processor electrically connected to the display and the user input unit; and
    at least one memory electrically connected to the processor,
    wherein the at least one memory stores instructions, which when executed, instruct the at least one processor to:
        display a plurality of user interfaces for content recommendation on the display,
        receive interest information of the user and identification information of another party associated with the interest information input through the plurality of user interfaces,
        acquire at least one recommendation content based on the interest information, history information of the user, history information of the another party, and a recommendation weight between the user and the another party, and
        display the at least one recommendation content on the display, wherein the plurality of user interfaces include a user interface for receiving the recommendation weight between the user and the another party, and wherein, if a recommendation weight of either the another party or the user is input the user interface automatically determines a recommendation weight of the other party thereof.

2. The electronic device of claim 1, wherein the plurality of user interfaces include the user interface receiving the recommendation weight between the user and the another party, and wherein the recommendation weight is a recommendation weight input by the user through the user interface.

3. The electronic device of claim 1, wherein the recommendation weight between the user and the another party is stored in the memory.

4. The electronic device of claim 1, further comprising:
a communication unit configured to communicate with an external device,
wherein the memory further stores instructions to allow the processor to
transmit the interest information of the user, the identification information of the user, the identification information of the another party, and the recommendation weight to the external device via the communication unit, and
receive the at least one recommendation content from the external device via the communication unit as a response to the transmission.

5. The electronic device of claim 1, further comprising:
a communication unit configured to communicate with an external device,
wherein the memory further stores instructions to allow the processor to transmit a message requesting approval to a collection of the history information of the another party to the external device via the communication unit.

6. The electronic device of claim 1, wherein if the number of other parties is more than one, the plurality of user interfaces include a user interface which receives recommendation weights of the user and each of the plurality of users.

7. The electronic device of claim 1, wherein the history information includes history information on which the user and the another party works on by accessing a service providing server.

8. The electronic device of claim 1, wherein the history information includes history information according to an event generated from the electronic device of the user and generated from the electronic device of the another party.

9. The electronic device of claim 1, wherein the instructions, when executed, instruct the processor to:
determine the recommendation weight between the user and the another party based on receiving a recommendation weight of either the another party or the user through the user interface.

10. The electronic device of claim 1, wherein the plurality of user interfaces include a first user interface for receiving the interest information, a second user interface for receiving the other party associated with the interest information, and a third user interface for receiving the recommendation weight between the user and the other party.

11. A recommendation device for determining recommendation content, comprising:
a communication unit configured to communicate with a first external device and a second external device;
at least one processor electrically connected to the communication unit; and
at least one memory electrically connected to the at least one processor,
wherein the at least one memory stores instructions, which when executed, instruct the processor to:
receive interest information of a user of the first external device, identification information of the user, identification information of another party associated with the interest information, and a recommendation weight between the user and the another party from the first external device via the communication unit,
receive history information of the user and history information of the another party from the second external device,
determine a plurality of candidate contents based on the history information of the user, and the history information of the another party,
determine at least one recommendation content from among the plurality of candidate contents based on the recommendation weight between the user and the another party, and
transmit the at least one recommendation content to the first external device.

12. The recommendation device of claim 11, wherein the instructions, when executed, instruct the processor to:
determine a preference of the user for each of the plurality of candidate contents based on the history information of the user,
determine a preference of the another party for each of the plurality of candidate contents based on the history information of the another party, and
determine at least one recommendation content from among the plurality of candidate contents based on the recommendation weight between the user and the another party, the determined preference of the user, and the determined preference of the another party.

13. The recommendation device of claim 11, wherein the instructions, when executed, instruct the processor to:
transmit the identification information of the user and the identification information of the another party to the second external device, and
receive the history information of the user and the history information of the another party from the second external device as a response to the transmission.

14. A method for providing recommendation content of an electronic device, comprising:
displaying a plurality of user interfaces for content recommendation, wherein the plurality of user interfaces include a user interface for receiving a recommendation weight between a user and another party;
receiving interest information of the user and identification information of the another party associated with the interest information through the plurality of user interfaces;
acquiring at least one recommendation content based on the interest information, history information of the user, history information of the another party, and the recommendation weight between the user and the another party; and
displaying the at least one recommendation content on a display,
wherein, if a recommendation weight of either the another party or the user is input, the user interface automatically determines a recommendation weight of the other thereof.

15. The method of claim 14, further comprising:
determining the recommendation weight between the user and the another party based on receiving a recommendation weight of either the another party or the user through the user interface.

16. The method of claim 15, further comprising:
displaying a first user interface for receiving the interest information and a second user interface for receiving the other party associated with the interest information on the display,
receiving the interest information through the first user interface,
receiving the identification information of the another party through the second user interface,
based on receiving the interest information and the identification information through the first user interface and the second interface, displaying a third user interface for receiving the recommendation weight between the user and the other party on the display, and
receiving a recommendation weight of either the another party or the user through the third user interface.

17. The method of claim 14, wherein acquiring the at least one recommendation includes transmitting the interest information of the user, the identification information of the user, the identification information of the another party, and the recommendation weight to an external device, and
receiving at least one recommendation content determined by the external device based on the interest information, the history information of the user, the history information of the another party, and the recommendation weight from the external device.

18. The method of claim 14, further comprising:
transmitting a message requesting approval to a collection of the history information of the another party to the external device.

19. The method of claim 14, wherein the plurality of user interfaces include a first user interface for receiving the interest information, a second user interface for receiving the other party associated with the interest information, and a third user interface for receiving the recommendation weight between the user and the other party.

20. A method for determining a recommendation content of a recommendation device, comprising:
receiving interest information of a user of a first external device, identification information of the user, identification information of another party associated with the interest information, and a recommendation weight between the user and the another party from the first external device;
receiving history information of the user and history information of the another party from a second external device,
determining a plurality of candidate contents based on the history information of the user, and the history information of the another party,
determining at least one recommendation content from among the plurality of candidate contents based on the recommendation weight between the user and the another party, and
transmitting the at least one recommendation content to the first external device.

21. The method of claim 20, wherein determining the at least one recommendation content includes:
determining a preference of the user for each of the plurality of candidate contents based on the history information of the user,
determining a preference of the another party for each of the plurality of candidate contents based on the history information of the another party, and
determining at least one recommendation content from among the plurality of candidate contents based on the recommendation weight between the user and the another party, the determined preference of the user, and the determined preference of the another party.

* * * * *